United States Patent
Pfeiffer et al.

(10) Patent No.: US 10,266,672 B2
(45) Date of Patent: Apr. 23, 2019

(54) PLASTICIZER COMPOSITION COMPRISING POLYMERIC DICARBOXYLIC ESTERS

(71) Applicant: BASF SE, Ludwigshafen (DE)

(72) Inventors: Matthias Pfeiffer, Böhl-Iggelheim (DE); Boris Breitscheidel, Waldsee (DE); Axel Grimm, Edenkoben (DE); Herbert Morgenstern, Ellerstadt (DE)

(73) Assignee: BASF SE (DE)

( * ) Notice: Subject to any disclaimer, the term of this patent is extended or adjusted under 35 U.S.C. 154(b) by 0 days.

(21) Appl. No.: 15/504,454

(22) PCT Filed: Aug. 18, 2015

(86) PCT No.: PCT/EP2015/068910
§ 371 (c)(1),
(2) Date: Feb. 16, 2017

(87) PCT Pub. No.: WO2016/026838
PCT Pub. Date: Feb. 25, 2016

(65) Prior Publication Data
US 2017/0233548 A1 Aug. 17, 2017

(30) Foreign Application Priority Data

Aug. 19, 2014 (EP) .................................. 14181413
Sep. 4, 2014 (EP) .................................. 14183613

(51) Int. Cl.
*C08K 5/11* (2006.01)
*C08L 27/06* (2006.01)
(Continued)

(52) U.S. Cl.
CPC . *C08K 5/11* (2013.01); *C08J 5/18* (2013.01); *C08K 5/0016* (2013.01); *C08K 5/10* (2013.01);
(Continued)

(58) Field of Classification Search
None
See application file for complete search history.

(56) References Cited

U.S. PATENT DOCUMENTS 2,921,089 A 1/1960 Hagemeyer, Jr. et al.
3,418,351 A 12/1968 Greene et al.
(Continued)

FOREIGN PATENT DOCUMENTS

DE 1593368 A1 7/1970
DE 1945359 A1 3/1971
(Continued)

OTHER PUBLICATIONS

National Industrial Chemicals Notification and Assessment Scheme, National Occupational Health and Safety Commission, Australian Government. Nov. 1998. (Year: 1998).*
(Continued)

*Primary Examiner* — Richard A Huhn
(74) *Attorney, Agent, or Firm* — Drinker Biddle & Reath LLP

(57) ABSTRACT

The present invention relates to a plasticizer composition which comprises at least one polymeric dicarboxylic ester, to molding compositions which comprise a thermoplastic polymer or an elastomer and such a plasticizer composition, and to the use of these plasticizer compositions and molding compositions.

24 Claims, 2 Drawing Sheets

(51) Int. Cl.
  *C08K 5/00* (2006.01)
  *C08K 5/10* (2006.01)
  *C08J 5/18* (2006.01)

(52) U.S. Cl.
  CPC .......... *C08L 27/06* (2013.01); *C08J 2327/06* (2013.01); *C08J 2467/02* (2013.01); *C08K 2201/014* (2013.01)

(56) References Cited

U.S. PATENT DOCUMENTS

| | | | |
|---|---|---|---|
| 3,929,898 | A | 12/1975 | Nienburg et al. |
| 3,932,523 | A | 1/1976 | Strohmeyer et al. |
| 4,009,124 | A | 2/1977 | Laurer et al. |
| 4,148,830 | A | 4/1979 | Pruett et al. |
| 4,426,524 | A | 1/1984 | Plummer |
| 4,623,748 | A | 11/1986 | Johnson |
| 5,281,647 | A | 1/1994 | Eapen |
| 5,288,918 | A | 2/1994 | Maher et al. |
| 5,324,853 | A | 6/1994 | Jones et al. |
| 5,434,313 | A | 7/1995 | Harrison et al. |
| 5,696,297 | A | 12/1997 | Kneuper et al. |
| 5,849,972 | A | 12/1998 | Vicari et al. |
| 6,225,507 | B1 | 5/2001 | Giessler et al. |
| 6,310,235 | B1 | 10/2001 | Gick |
| 6,310,261 | B1 | 10/2001 | Geissler et al. |
| 6,437,170 | B1 | 8/2002 | Thil et al. |
| 6,624,285 | B2 | 9/2003 | Holzmann et al. |
| 6,723,884 | B1 | 4/2004 | Grenacher et al. |
| 6,765,119 | B2 | 7/2004 | Hoffmann et al. |
| 6,888,021 | B2 | 5/2005 | Brunner et al. |
| 7,173,138 | B2 | 2/2007 | Ahlers et al. |
| 7,208,545 | B1 | 4/2007 | Brunner et al. |
| 2006/0025544 | A1 | 2/2006 | Koube et al. |
| 2009/0288359 | A1* | 11/2009 | Martin, Jr. .......... C08K 5/0016 52/309.1 |
| 2014/0221593 | A1 | 8/2014 | Bradstadt et al. |

FOREIGN PATENT DOCUMENTS

| | | | |
|---|---|---|---|
| DE | 2009505 A1 | 9/1971 | |
| DE | 2139630 A1 | 2/1973 | |
| DE | 2244373 A1 | 4/1974 | |
| DE | 2404855 A1 | 8/1975 | |
| DE | 2445303 A1 | 4/1976 | |
| DE | 2612355 A1 | 10/1977 | |
| DE | 2628987 A1 | 1/1978 | |
| DE | 3228881 A1 | 2/1984 | |
| DE | 4339713 A1 | 5/1995 | |
| EP | 366089 A2 | 5/1990 | |
| EP | 695734 A1 | 2/1996 | |
| EP | 880494 A1 | 12/1998 | |
| EP | 1047655 A1 | 11/2000 | |
| EP | 1113034 A1 | 7/2001 | |
| EP | 1171413 A1 | 1/2002 | |
| EP | 1813645 A1 | 8/2007 | |
| GB | 1013605 A * | 12/1965 | .............. C08K 5/04 |
| GB | 1330112 A | 9/1973 | |
| GB | 1579159 A | 11/1980 | |
| JP | 51103954 U * | 8/1976 | |
| JP | 09319043 A * | 12/1997 | |
| RO | 104737 B1 | 9/1994 | |
| WO | WO-9514647 A1 | 6/1995 | |
| WO | WO-9730016 A1 | 8/1997 | |
| WO | WO-9823566 A1 | 6/1998 | |
| WO | WO-9932427 A1 | 7/1999 | |
| WO | WO-9936382 A1 | 7/1999 | |
| WO | WO-0063151 A1 | 10/2000 | |
| WO | WO-0078704 A1 | 12/2000 | |
| WO | WO-01014297 A1 | 3/2001 | |
| WO | WO-01087809 A1 | 11/2001 | |
| WO | WO-0283695 A1 | 10/2002 | |
| WO | WO-03029339 A1 | 4/2003 | |
| WO | WO-05028407 A1 | 3/2005 | |

OTHER PUBLICATIONS

Barshtein, R. S.; Ermolaev, G. S. "Compatibility of polyester plasticizers with poly(vinyl chloride)". Plasticheskie Massy 1970, 10, 47-49. (Year: 1970).*

CAPLUS abstract for Phillips, J. et al. "Effect of number of carboxyl groups on liquid density of esters of alkylcarboxylic acids". Journal of Chemical and Engineering Data 1978, 23(1), 1-6. (Year: 1978).*

U.S. Appl. No. 15/323,514, filed Jan. 3, 2017.

U.S. Appl. No. 15/508,164, filed Mar. 2, 2017.

International Preliminary Examination Report for PCT/EP2015/068910 dated Nov. 8, 2016.

International Search Report for PCT/EP2015/068910 dated Oct. 23, 2015.

* cited by examiner

PLASTICIZER COMPOSITION COMPRISING POLYMERIC DICARBOXYLIC ESTERS

CROSS-REFERENCE TO RELATED APPLICATIONS

This application is a national stage application (under 35 U.S.C. § 371) of PCT/EP2015/068910, filed Aug. 18, 2015, which claims benefit of European Application Nos. 14181413.7, filed Aug. 19, 2014, and 14183613.0, filed Sep. 4, 2014, all of which are incorporated herein by reference in their entirety.

BACKGROUND OF THE INVENTION

The present invention relates to a plasticizer composition which comprises at least one polymeric dicarboxylic ester, to molding compositions which comprise a thermoplastic polymer or an elastomer and this plasticizer composition, and to the use of these plasticizer compositions and molding compositions.

PRIOR ART

Desired processing properties or desired performance properties are achieved in many plastics by adding what are known as plasticizers, in order to render the plastics softer, more flexible and/or more extensible. In general, the use of plasticizers serves to shift the thermoplastic range of plastics toward lower temperatures, so that the desired elastic properties are obtained in the region of low processing temperatures and service temperatures.

Production quantities of polyvinyl chloride (PVC) are among the highest of any plastic. Because of the versatility of this material, it is nowadays found in a wide variety of products used in everyday life. PVC therefore has very great economic importance. Intrinsically, PVC is a plastic which is hard and brittle at up to about 80° C., and is used in the form of rigid PVC (PVC-U) by addition of heat stabilizers and other adjuvants. Flexible PVC (PVC-P) is obtained only by adding suitable plasticizers, and can be used for many applications for which rigid PVC is unsuitable.

Examples of other important thermoplastic polymers in which plasticizers are usually used are polyvinyl butyral (PVB), homopolymers and copolymers of styrene, polyacrylates, polysulfides, or thermoplastic polyurethanes (PU).

The suitability of a substance for use as a plasticizer for a particular polymer depends largely on the properties of the polymer that is to be plasticized. The desire is generally for plasticizers which enjoy high compatibility with the polymer to be plasticized, which endow it with good thermoplastic properties, and which possess only low propensity to evaporation and/or exudation (high permanence).

A host of different compounds are available on the market for the plasticizing of PVC and other plastics. On account of their high compatibility with PVC and because of their advantageous performance properties, phthalic diesters with alcohols of various chemical structures have been much used in the past as plasticizers, examples being diethlhexyl phthalate (DEHP), diisononyl phthalate (DINP), and diisodecyl phthalate (DIDP).

There is a need to replace at least some of the aforementioned phthalate plasticizers, since they are suspected of being damaging to health. This applies especially to sensitive areas of application, such as children's toys, packaging for food and drinks, or medical articles.

There are various alternative plasticizers known in the prior art, having different properties, for diverse plastics and especially for PVC.

One class of plasticizer known from the prior art, which can be used as an alternative to phthalates, is based on cyclohexanepolycarboxylic acids, as described in WO 99/32427. In contrast to their unhydrogenated aromatic analogs, these compounds are toxicologicaly unobjectionable and can be used even in sensitive areas of application.

WO 00/78704 describes selected dialkyl cyclohexane-1, 3- and 1,4-dicarboxylic esters for use as plasticizers in synthetic materials.

Furthermore, esters of adipic acid are also used as plasticizers, especially for polyvinyl chloride. The most important representatives are adipic esters with $C_8$, $C_9$, and $C_{10}$ alcohols, e.g., di(2-ethylhexyl) adipate, diisononyl adipates, and diisodecyl adipates.

The adipic esters stated are used in particular in foils, profiles, synthetic leathers, cables, and lines based on flexible PVC, when these products are to be used at low temperatures.

DE 2 009 505, for example, describes isononanols for the preparation of bis-isononyl esters of phthalic acid or adipic acid, and describes the use of these bis-isononyl esters as plasticizers for polyvinyl chloride. The isononanols used in preparing the bis-isononyl esters are prepared from 2-ethylhexene by the oxo process, by reaction with carbon monoxide and hydrogen, with optional subsequent hydrogenation. The bis(isononyl) adipic esters described are said to be suitable as plasticizers for polyvinyl chloride and to be distinguished by low volatility, low viscosity, and good low-temperature strength in the polyvinyl chloride materials plasticized using them.

U.S. Pat. No. 4,623,748 describes dialkyl adipates prepared by esterifying adipic acid with long-chain alcohols. The $C_9$, $C_{10}$, and/or $C_{13}$ alcohols used for the esterification are obtained by reaction of propylene or butylenes oligomers from the Dimersol process, in the presence of supported tantalum(V) halides/oxides as catalysts, to give the corresponding $C_8$, $C_9$ and/or $C_{12}$ olefins, which are subjected subsequently to hydroformylation. These dialkyl adipates are said to be notable for high flash points and to be suitable for use as lubricants.

EP 1 171 413 describes mixtures of diesters of adipic acid or of phthalic acid with isomeric nonanols. The diesters described are said to be suitable as plasticizers for polyvinyl chloride and to be distinguished in particular by very good low-temperature elasticity properties in the polyvinyl chloride materials plasticized using them.

Besides monomeric plasticizers, various polyesters are likewise used as plasticizers. Polyester plasticizers are generally prepared by esterification of polyhydric alcohols, as for example 1,2-ethanediol, 1,2-propanediol, 1,3-propanediol, 1,3-butanediol, 1,4-butanedol, 1,5-pentanedol, or 1,6-hexanediol, with a polycarboxylic acid, such as succinic acid, glutaric acid, adipic acid, pimelic acid, suberic acid, sebacic acid, or azelaic acid. Optionally it is possible for terminal alcohol groups (In the case of syntheses with alcohol excess) to be capped with monocarboxylic acids, acetic acid for example, or for terminal acid groups (in the case of syntheses with acid excess) to be capped with monohydric alcohols, such as 2-ethylhexanol, isononanol, 2-propylheptanol or isodecanol. Polyester plasticizers are used primarily in the production of foils, coatings, profiles, floor coverings, and cables based on flexible PVC, when heightened requirements are imposed on the resistance to extraction, relative to mineral spirit, oils, and fats, among others, and on the UV resistance and on the volatility of the plasticizer.

U.S. Pat. No. 5,281,647 describes a method for producing polyester plasticizers where dicarboxylic acids, such as sebacic acid, glutaric acid, azelaic acid and/or adipic acid, are reacted with strongly sterically hindered diols and small amounts of linear diols to form polyesters, after which the acidic end groups of the polyesters are esterified with a further alcohol, and also describes the use thereof for plasticizing rubber and PVC.

Specifically described is the preparation of a polyester plasticizer on the basis of adipic acid, trimethylpentanediol, and propylene glycol, the terminal acid groups being esterified with 2-ethylhexanol. These polyesters are said to be suitable as plasticizers for PVC and rubber and to be distinguished by high extraction resistance in relation to oils and soapy water.

RO 104 737 describes polyester plasticizers based on adipic acid and propylene glycol, their terminal acid groups being esterified with 2-ethylhexanol. The polyesters are said to be suitable as plasticizers for PVC and to be notable in particular for high stability in storage.

EP 1 113 034 describes polyester plasticizers obtainable by reaction of aliphatic dicarboxylic acids, neopentyl alcohol, at least one further diol, and isomeric nonanols, a process for preparing them, and their use as plasticizers. The polyesters are said to be distinguished in particular by low migration propensity, especially with respect to acrylonitrile-butadiene-styrene copolymers, polystyrene, and polymethyl methacrylate.

Another known measure for setting the desired plasticizer properties is to use mixtures of plasticizers—for example, at least one plasticizer which imparts good thermoplastic properties but does not gel so well, in combination with at least one plasticizer which imparts good gelling properties.

WO 03/029339 discloses PVC compositions comprising cyclohexanepolycarboxylic esters, and also mixtures of cyclohexanepolycarboxylic esters with other plasticizers. Suitable other plasticizers stated are nonpolymeric ester plasticizers, such as terephthalic esters, phthalic esters, isophthalic esters, and adipic esters. Further disclosed are PVC compositions comprising mixtures of cyclohexanepolycarboxylic esters with various fast-gelling plasticizers. Suitable fast-gelling plasticizers mentioned are, in particular, various benzoates, aromatic sulfonic esters, citrates, and also phosphates. Polyester plasticizers are mentioned only as part of a very comprehensive list, without being particularized in any way at all in the patent specification.

A substantial disadvantage of the majority of plasticizers and plasticizer compositions described above that are possible alternatives to phthalates from a toxicological standpoint, however, is that they lack effective compatibility with plastics, especially with PVC; in other words, they exude to a considerable extent during use, and therefore result in a partial loss of the elastic properties of the plasticized plastics produced using these plasticizers. This is true in particular of the polyester plasticizers, whose use is vital for many applications where heightened requirements are imposed on the extraction resistance, relative to mineral spirit, oils, and fats, among other substances, and on the UV resistance and on the volatility of the plasticizer.

It is an object of the present invention to provide a toxicologically unobjectionable plasticizer composition, comprising at least one polyester plasticizer for thermoplastic polymers and elastomers, which has high compatibility with the polymer to be plasticized and which as a result shows little or no propensity toward exudation during service, thereby maintaining the elastic properties of the plasticized plastics produced using these plasticizers, even over prolonged periods of time.

This object is surprisingly achieved by a plasticizer composition comprising
a) one or more compounds of the general formula (I),

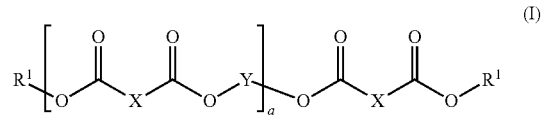

in which
X independently at each occurrence is an unbranched or branched $C_2$-$C_8$ alkylene group or an unbranched or branched $C_2$-$C_8$ alkenylene group, comprising at least one double bond,
Y is an unbranched or branched $C_2$-$C_{12}$ alkylene group or an unbranched or branched $C_2$-$C_{12}$ alkenylene group, comprising at least one double bond,
a is an integer from 1 to 100,
and
$R^1$ independently at each occurrence is selected from unbranched or branched $C_4$-$C_{12}$ alkyl radicals,
where the groups X present in the compounds (I) may be the same or different and where, in the event that the compounds (I) comprise more than one group Y, these groups may be the same or different from one another,
b) one or more compounds of the general formula (II),

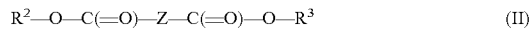

in which
Z is an unbranched or branched $C_2$-$C_8$ alkylene group or an unbranched or branched $C_2$-$C_8$ alkenylene group, comprising at least one double bond,
and
$R^2$ and $R^3$ independently of one another are selected from unbranched and branched $C_4$-$C_{12}$ alkyl radicals.

A further subject of the Invention are molding compositions which comprise at least one thermoplastic polymer or elastomer and a plasticizer composition as defined above and hereinafter.

A further subject of the invention is the use of a plasticizer composition as defined above and hereinafter as plasticizer for thermoplastic polymers, more particularly polyvinyl chloride (PVC), and elastomers.

A further subject of the invention is the use of these molding compositions for producing moldings and foils.

DESCRIPTION OF THE INVENTION

Figure 1:
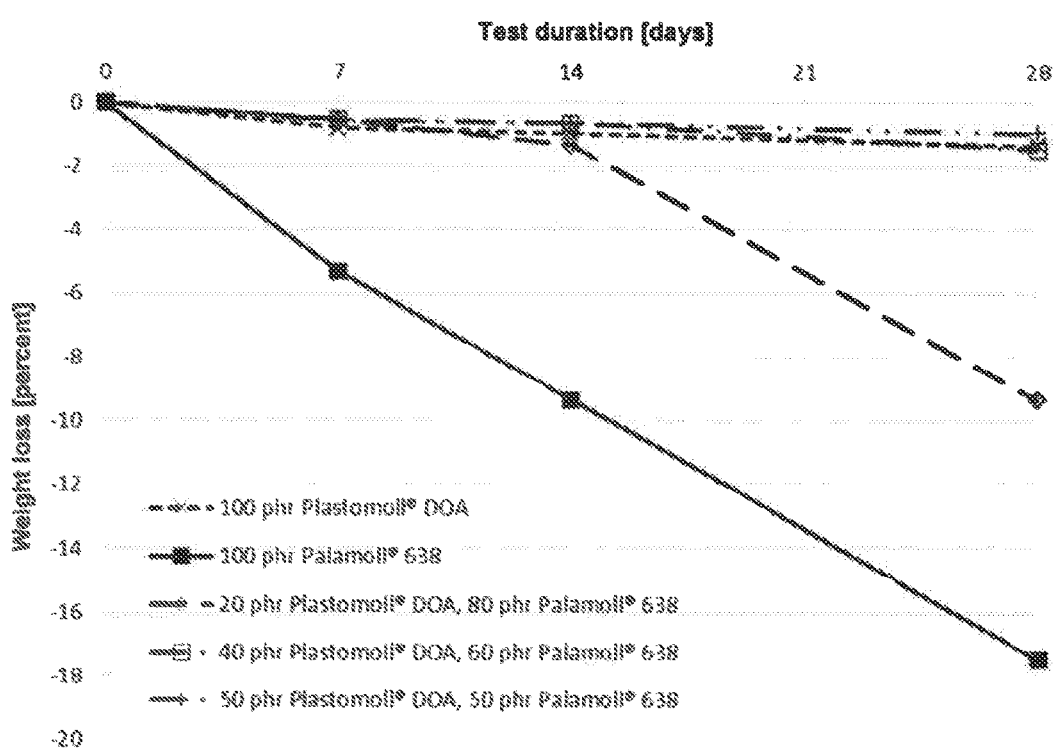
FIG. 1 shows the plasticizer compatibility of flexible PVC foils containing 100 phr of plasticizer compositions which comprise Palamoll® 638 and Plastomoll® DOA in different proportions, and also, for comparison, flexible PVC foils containing exclusively the commercially available plasticizer Plastomoll® DOA or Palamoll® 638. The variable shown is the loss of dry weight [percent] as a function of the test duration (storage time) [days].

The plasticizer compositions of the invention have the following advantages:

- The plasticizer compositions of the invention are notable for high compatibility with the polymers to be plasticized, more particularly PVC.
- The plasticizer compositions of the invention show no tendency at all, or only a slight tendency, to exude during the service of the end products. As a result, the elastic properties of the plasticized plastics produced using these plasticizer compositions are obtained, even over prolonged periods of time.
- The plasticizer compositions of the invention are suitable advantageously for the attainment of a multiplicity of very different and complex processing properties and performance properties of plastics.
- The plasticizer compositions of the Invention are suitable for use for producing moldings and foils for sensitive areas of application, such as medical products, packaging for food and drink, products for the interior sector, as for example of dwellings and vehicles, toys, child-care items, etc.
- The compounds (I) present in the plasticizer compositions of the invention can be produced using readily available starting materials.
- The processes for the preparation of the compounds (I) used in accordance with the invention are simple and efficient. The compounds (I) can therefore be provided readily on an industrial scale.

For the purposes of the present invention, the expression "$C_2$-$C_{12}$ alkylene" refers to divalent hydrocarbon radicals having 2 to 12 carbon atoms. The divalent hydrocarbon radicals may be unbranched or branched. They include, for example, 1,2-ethylene, 1,2-propylene, 1,3-propylene, 1,3-butylene, 1,4-butylene, 2-methyl-1,3-propylene, 1,1-dimethyl-1,2-ethylene, 1,4-pentylene, 1,5-pentylene, 2-methyl-1,4-butylene, 2,2-dimethyl-1,3-propylene, 1,6-hexylene, 2-methyl-1,5-pentylene, 3-methyl-1,5-pentylene, 2,3-dimethyl-1,4-butylene, 1,7-heptylene, 2-methyl-1,6-hexylene, 3-methyl-1,6-hexylene, 2-ethyl-1,5-pentylene, 3-ethyl-1,5-pentylene, 2,3-dimethyl-1,5-pentylene, 2,4-dimethyl-1,5-pentylene, 1,8-octylene, 2-methyl-1,7-heptylene, 3-methyl-1,7-heptylene, 4-methyl-1,7-heptylene, 2-ethyl-1,6-hexylene, 3-ethyl-1,6-hexylene, 2,3-dimethyl-1,6-hexylene, 2,4-dimethyl-1,6-hexylene, 1,9-nonylene, 2-methyl-1,8-octylene, 3-methyl-1,8-octylene, 4-methyl-1,8-octylene, 2-ethyl-1,7-heptylene, 3-ethyl-1,7-heptylene, 1,10-decylene, 2-methyl-1,9-nonylene, 3-methyl-1,9-nonylene, 4-methyl-1,9-nonylene, 5-methyl-1,9-nonylene, 1,11-undecylene, 2-methyl-1,10-decylene, 3-methyl-1,10-decylene, 5-methyl-1,10-decylene, 1,12-dodecylene, and the like. Preferably "$C_2$-$C_{12}$ alkylene" comprises branched or unbranched $C_2$-$C_8$ alkylene groups, more preferably branched or unbranched $C_2$-$C_6$-alkylene groups, more particularly 1,2-propylene, 1,3-propylene, 1,4-butylene and 2,2-dimethyl-1,3-propylene.

The expression "$C_2$-$C_{12}$ alkylene" also includes within its definition the expression "$C_2$-$C_8$ alkylene", "$C_2$-$C_6$ alkylene", and "$C_2$-$C_5$ alkylene".

For the purposes of the present invention, the expression "$C_2$-$C_{12}$ alkenylene" relates to divalent hydrocarbon radicals having 2 to 12 carbon atoms, which may be unbranched or branched, with the main chain having at least one double bond. The "$C_2$-$C_{12}$ alkenylene" preferably comprises branched and unbranched $C_2$-$C_8$ alkenylene groups having one double bond. These include, for example, ethenylene, propenylene, 1-methylethenylene, 1-, 2-butenylene, 1-methylpropenylene, 2-methylpropenylene, 1-, 2-pentenylene, 1-methyl-1-butenylene, 1-methyl-2-butenylene, 1-, 2-, 3-hexenylene, 1-methyl-1-pentenylene, 1-methyl-2-pentenylene, 1-methyl-3-pentenylene, 1,4-dimethyl-1-butenylene, 1,4-dimethyl-2-butenylene, 1-, 2-, 3-heptenylene, 1-, 2-, 3-octenylene, and the like. With particular preference the "$C_2$-$C_{12}$ alkenylene" comprises branched and unbranched $C_2$-$C_6$ alkenylene groups having one double bond, more particularly branched and unbranched $C_2$-$C_4$ alkenylene groups having one double bond.

The double bonds in the $C_2$-$C_{12}$ alkenylene groups may independently of one another be present in the E- or in Z-configuration or as a mixture of both configurations.

The expression "$C_2$-$C_{12}$ alkenylene" also includes within its definition the expressions "$C_2$-$C_8$ alkenylene" and "$C_2$-$C_8$ alkenylene".

For the purposes of the present invention, the expression "$C_4$-$C_{12}$ alkyl" refers to unbranched or branched alkyl groups having 4 to 12 carbon atoms. These include n-butyl, isobutyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 1-methylpentyl, 2-methylpentyl, 1-ethylbutyl, 2-ethylbutyl, n-heptyl, 1-methylhexyl, 2-methylhexyl, 1-ethylpentyl, 2-ethylpentyl, 1-propylbutyl, 1-ethyl-2-methylpropyl, n-octyl, isooctyl, 2-ethylhexyl, n-nonyl, isononyl, 2-propylhexyl, n-decyl, isodecyl, 2-propylheptyl, n-undecyl, isoundecyl, n-dodecyl, isododecyl, and the like. Preferably "$C_4$-$C_{12}$ alkyl" comprises branched or unbranched $C_7$-$C_{12}$ alkyl groups, more particularly branched or unbranched $C_8$-$C_{10}$ alkyl groups.

The expression "$C_4$-$C_{12}$ alkyl" also includes within its definition the expressions "$C_7$-$C_{12}$ alkyl" and "$C_8$-$C_{10}$ alkyl".

X in the general formula (I), independently at each occurrence, is preferably an unbranched or branched $C_2$-$C_8$ alkylene group, more preferably an unbranched or branched $C_2$-$C_6$ alkylene group. More particularly, X in the general formula (I), independently at each occurrence, is an unbranched $C_2$-$C_5$ alkylene group ($=(CH_2)_k$ where k=2, 3, 4, or 5), especially 1,3-propylene and 1,4-butylene.

Y in the general formula (I) is preferably an unbranched or branched $C_2$-$C_{12}$ alkylene group, more preferably an unbranched or branched $C_2$-$C_6$ alkylene group. More particularly, Y in the general formula (I) is a branched or unbranched $C_3$-$C_5$ alkylene group, especially 1,2-propylene, 1,3-propylene, 1,4-butylene, and 2,2-dimethyl-1,3-propylene.

With preference the radicals $R^1$ in the general formula (I), independently of one another, are $C_8$-$C_{10}$ alkyl, as for example n-octyl, isooctyl, 2-ethylhexyl, n-nonyl, isononyl, 2-propylhexyl, n-decyl, isodecyl, or 2-propylheptyl. With particular preference the radicals $R^1$ in the general formula (I) are both n-octyl, both Isononyl, or both 2-propylheptyl.

The groups X present in the compounds (I) are preferably the same.

If the compounds (I) contain more than one group Y, then in a first preferred variant they are the same.

If the compounds (I) contain more than one group Y, then in a second variant they are different from one another.

In a first particularly preferred variant, the groups X present in the compounds (I) are the same, with the compounds (I) comprising more than one group Y which are different.

In a further particularly preferred variant, the groups X present in the compounds (I) are the same, with the compounds (I) comprising more than one group Y which are likewise the same.

In the compounds of the general formula (I), a Is preferably an integer from 1 to 70, more preferably an integer from 2 to 50, more particularly an integer from 5 to 40.

On account of their polymeric nature, the compounds of the general formula (I) used in the plasticizer compositions of the Invention are not unitary compounds, but are instead mixtures of different compounds. On the one hand, the compounds (I) have different chain lengths, and are characterized accordingly by an average molar mass. On the other hand, both radicals $R^1$, and also the groups X and Y present in the repeating units, may be different from one another. Furthermore, the radicals $R^1$ may comprise isomer mixtures, as defined below.

The polyester plasticizers of the general formula (I) that are present in the plasticizer compositions of the invention generally have a weight-average molar mass in the range from 500 to 15 000, preferably in the range from 2000 to 10 000, more preferably in the range from 3000 to 8000. The weight-average molar mass is determined in general by means of gel permeation chromatography (GPC) in tetrahydrofuran with respect to polystyrene standards.

The polyester plasticizers of the general formula (I) that are present in the plasticizer compositions of the invention generally possess a density at 20° C. to DIN 51757 in the range from 1.000 to 1.200 g/cm$^3$, preferably in the range from 1.010 to 1.170 g/cm$^3$, more preferably in the range from 1.020 to 1.150 g/cm$^3$.

The polyester plasticizers of the general formula (I) that are present in the plasticizer compositions of the invention generally possess a viscosity at 20° C. to DIN EN ISO 3219 In the range from 1000 to 20 000 mPa*s, preferably in the range from 1200 to 15 000 mPa*s, more preferably in the range from 1500 to 14 000 mPa*s. For the determination of the dynamic viscosity according to DIN EN ISO 3219, a small sample of the polymer plasticizer in question is applied using a disposable pipette to the stator of the rotor-stator unit, consisting of a cone/plate measuring unit with a diameter of 25 mm, of a suitable rheometer. The dynamic viscosity is then ascertained by a rotation measurement at 20° C. and 128 rpm.

The polyester plasticizers of the general formula (I) that are present in the plasticizer compositions of the invention generally possess a refractive index nD20 to DIN 51423 in the range from 1.440 to 1.485, preferably in the range of 1.450 to 1.480, more preferably in the range from 1.460 to 1.475.

In the compounds of the general formula (II), Z is preferably an unbranched $C_2$-$C_5$ alkylene group or an unbranched $C_2$-$C_4$ alkenylene group having one double bond.

More preferably, Z in the compounds of the general formula (II) is an unbranched $C_2$-$C_5$ alkylene group, more particularly 1,3-propylene and 1,4-butylene.

In the compounds of the general formula (II), the radicals $R^2$ and $R^3$, independently of one another, are preferably $C_8$-$C_{12}$ alkyl, as for example n-octyl, n-nonyl, isononyl, 2-ethylhexyl, isodecyl, 2-propylheptyl, n-undecyl, or Isoundecyl. More preferably the radicals $R^2$ and $R^3$ in the compounds of the general formula (II), independently of one another, are $C_8$-$C_{10}$ alkyl.

In a further preferred embodiment, the radicals $R^2$ and $R^3$ in the compounds of the general formula (II) are the same.

More particularly, in the compounds of the general formula (II), the radicals $R^2$ and $R^3$ are both 2-ethylhexyl, both isononyl, or both 2-propylheptyl.

Especially preferred compounds of the general formula (II) are di(2-ethylhexyl) adipate, di(isononyl) adipate, and di(2-propylheptyl) adipate.

In one preferred embodiment of the present invention, in the compounds of the general formulae (I) and (II),
X is an unbranched or branched $C_2$-$C_8$ alkylene group,
Y independently at each occurrence is an unbranched or branched $C_2$-$C_5$ alkylene group,
Z is an unbranched $C_2$-$C_5$ alkylene group,
a is an integer from 5 to 40,
$R^1$ independently at each occurrence is a $C_8$-$C_{10}$ alkyl group, and
$R^2$ and $R^3$ are both a $C_8$-$C_{12}$ alkyl group,
with the groups X present in the compounds (I) being the same.

In one particularly preferred embodiment of the present invention, in the compounds of the general formulae (I) and (II),
X is an unbranched $C_2$-$C_5$ alkylene group,
Y independently at each occurrence is an unbranched or branched $C_3$-$C_5$ alkylene group,
Z is 1,3-propylene and 1,4-butylene,
a is an integer from 5 to 40,
$R^1$ radicals are both n-octyl, both isononyl, or both 2-propylheptyl, and
$R^2$ and $R^3$ are both 2-ethylhexyl, both isononyl, or both 2-propylheptyl,
where the groups X present in the compounds (I) are the same.

By adapting the proportions of the compounds (I) and (II) in the plasticizer composition of the invention, the plasticizer properties can be tailored to the appropriate end use.

This can be accomplished by means of routine experiments. For use in specific areas of application it may possibly be useful to add further plasticizers, different from the compounds (I) and (II), to the plasticizer compositions of the invention. For this reason, the plasticizer composition of the invention may optionally comprise at least one further plasticizer, different from the compounds (I) and (II).

The additional plasticizer different from the compounds (I) and (II) is selected from phthalic acid alkyl aralkyl esters, 1,2-cyclohexanedicarboxylic esters, 1,3-cyclohexanedicarboxylic esters, 1,4-cyclohexanedicarboxylic esters, trimellitic trialkyl esters, benzoic alkyl esters, dibenzoic esters of glycols, hydroxybenzoic esters, esters of saturated monocarboxylic acids, esters of unsaturated monocarboxylic acids, esters of saturated dicarboxylic acids other than compounds (II), esters of unsaturated dicarboxylic acids other than compounds (II), amides and esters of aromatic sulfonic acids, alkylsulfonic esters, glycerol esters, isosorbide esters, phosphoric esters, citric triesters, alkylpyrrolidone derivatives, 2,5-furandicarboxylic esters, 2,5-tetrahydrofurandicarboxylic esters, epoxidized vegetable oils and epoxidized fatty acid monoalkyl esters, and polyesters of aliphatic and/or aromatic polycarboxylic acids with at least dihydric alcohols, other than compounds (I).

A suitable phthalic acid alkyl aralkyl ester is, for example, benzyl butyl phthalate. Suitable cyclohexane-1,2-dicarboxylic acid dialkyl esters have, independently of one another, 4 to 13 C atoms, preferably 8 to 13 C atoms, in the alkyl chains. An example of a suitable cyclohexane-1,2-dicarboxylic acid dialkyl ester is diisononyl cyclohexane-1,2-dicarboxylate. Suitable cyclohexane-1,3-dicarboxylic esters have, independently of one another, 4 to 13 C atoms, preferably 8 to 13 C atoms, in the alkyl chains. Suitable cyclohexane-1,4-dicarboxylic esters have, independently of one another, 4 to 13 C atoms, more particularly 8 to 11 C atoms, in each of the alkyl chains. A suitable cyclohexane-1,4-dicarboxylic ester is, for example, di-2-ethylhexyl cyclohexane-1,4-dicarboxylate. The trimellitic acid trialkyl esters preferably have, independently of one another, in each case 4 to 13 C atoms, more particularly 7 to 11 C atoms, in the alkyl chains. Suitable benzoic acid alkyl esters preferably have, independently of one another, in each case 7 to 13 C atoms, more particularly 9 to 13 C atoms, in the alkyl chains. Suitable benzoic acid alkyl esters are, for example, isononyl benzoate, isodecyl benzoate, or 2-propylheptyl benzoate. Suitable dibenzoic esters of glycols are diethylene glycol dibenzoate dipropylene glycol dibenzoate, tripropylene glycol dibenzoate and dibutylene glycol dibenzoate. Suitable esters of saturated monocarboxylic acids are, for example, esters of acetic acid, butyric acid, valeric acid, or lactic acid. Suitable esters of unsaturated monocarboxylic acids are, for example, esters of acrylic acid. Suitable esters of saturated dicarboxylic acids that are different from compounds (II) are, for example, esters of malic acid or tartaric acid. Suitable alkylsulfonic esters preferably have an alkyl radical with 8 to 22 C atoms. They include, for example, phenyl or cresyl esters of pentadecylsulfonic acid. Suitable isosorbide esters are isosorbide diesters, which are preferably esterified with $C_8$-$C_{13}$ carboxylic acids. Suitable phosphoric esters are tri-2-ethylhexyl phosphate, trioctyl phosphate, triphenyl phosphate, isodecyl diphenyl phosphate, bis(2-ethylhexyl) phenyl phosphate, and 2-ethylhexyl diphenyl phosphate. In the citric triesters, the OH group may be present in free or carboxylated form, preferably acetylated. The alkyl radicals of the acetylated citric triesters preferably independently of one another have 4 to 8 C atoms, more particularly 6 to 8 C atoms. Alkylpyrrolidone derivatives having alkyl radicals of 4 to 18 C atoms are suitable. Suitable 2,5-Furandicarboxylic acid dialkyl esters have, independently of one another, in each case 7 to 13 C atoms, preferably 8 to 12 C atoms, in the alkyl chains. Suitable 2,5-tetrahydrofurandicarboxylic acid dialkyl esters have, independently of one another, in each case 7 to 13 C atoms, preferably 8 to 12 C atoms, in the alkyl chains. A suitable epoxidized vegetable oil is, for example, epoxidized soybean oil, e.g. available from Galata-Chemicals, Lampertheim, Germany. Epoxidized fatty acid monoalkyl esters, as for example available under the trade name reFlex™ from PolyOne, USA, are also suitable.

In all of the cases stated above, the alkyl radicals may in each case be linear or branched and in each case identical or different. Reference is made to the general observations given at the outset regarding suitable and preferred alkyl radicals.

The amount of the at least one further plasticizer, different from the compounds (I) and (II), in the plasticizer composition of the invention is customarily 0 to 50 wt %, preferably 0 to 40 wt %, more preferably 0 to 30 wt %, and more particularly 0 to 25 wt %, based on the total amount of the at least one further plasticizer and of the compounds (I) and (II) in the plasticizer composition.

In one preferred embodiment the plasticizer composition of the invention contains no further plasticizers different from the compounds (I) and (II).

The amount of the compounds of the general formula (I) in the plasticizer composition of the invention is preferably 10 to 99 wt %, more preferably 30 to 95 wt %, and more particularly 50 to 90 wt %, based on the total amount of the compounds (I) and (II) in the plasticizer composition.

The amount of the compounds of the general formula (II) in the plasticizer composition of the invention is preferably 1 to 90 wt %, more preferably 5 to 70 wt %, and more particularly 10 to 50 wt %, based on the total amount of the compounds (I) and (II) in the plasticizer composition.

In the plasticizer composition of the invention, the weight ratio between compounds of the general formula (II) and compounds of the general formula (I) is preferably in the range from 1:100 to 10:1, more preferably in the range from 1:20 to 2:1 and in particular in the range from 1:10 to 1:1.

Molding Compositions

A further subject of the present invention relates to a molding composition comprising at least one polymer and a plasticizer composition as defined above.

In one preferred embodiment, the polymer present in the molding composition comprises a thermoplastic polymer.

Thermoplastic polymers that are suitable include all polymers which can be processed thermoplastically. More particularly these thermoplastic polymers are selected from:

homopolymers or copolymers comprising in copolymerized form at least one monomer selected from $C_2$-$C_{10}$ monoolefins, such as, for example, ethylene or propylene, 1,3-butadiene, 2-chloro-1,3-butadiene, esters of $C_2$-$C_{10}$ alkyl acids with vinyl alcohol, vinyl chloride, vinylidene chloride, vinylidene fluoride, tetrafluoroethylene, glycidyl acrylate, glycidyl methacrylate, acrylates and methacrylates with alcohol components from branched and unbranched $C_1$-$C_{10}$ alcohols, vinylaromatics such as, for example, styrene, (meth)acrylonitrile, α,β-ethylenically unsaturated monocarboxylic and dicarboxylic acids, and maleic anhydride;

homopolymers and copolymers of vinyl acetals;

polyvinyl esters;

polycarbonates (PC);

polyesters, such as polyalkylene terephthalates, polyhydroxyalkenoates (PHA), polybutylenesuccinates (PBS), polybutylenesuccinate adipates (PBSA);

polyethers;

polyetherketones;

thermoplastic polyurethanes (TPU);

polysulfides;

polysulfones;

and mixtures thereof.

Examples include polyacrylates with identical or different alcohol residues from the group of the $C_4$-$C_8$ alcohols, particularly those of butanol, hexanol, octanol, and 2 ethylhexanol, polymethyl methacrylate (PMMA), methyl methacrylate-butyl acrylate copolymers, acrylonitrile-butadiene-styrene copolymers (ABS), ethylene-propylene copolymers, ethylene-propylene-diene copolymers (EPDM), polystyrene (PS), styrene-acrylonitrile copolymers (SAN), acrylonitrile-styrene-acrylate (ASA), styrene-butadiene-methyl methacrylate copolymers (SBMMA), styrene-maleic anhydride copolymers, styrene-methacrylic acid copolymers (SMA), polyoxymethylene (POM), polyvinyl alcohol (PVAL), polyvinyl acetate (PVA), polyvinyl butyral (PVB), polycaprolactone (PCL), polyhydroxybutyric acid (PHB), polyhydroxyvaleric acid (PHV), polylactic acid (PLA), ethylcellulose (EC), cellulose acetate (CA), cellulose propionate (CP), or cellulose acetate/butyrate (CAB).

The at least one thermoplastic polymer present in the molding composition of the invention preferably comprises polyvinyl chloride (PVC), polyvinyl butyral (PVB), homopolymers and copolymers of vinyl acetate, homopolymers and copolymers of styrene, polyacrylates, thermoplastic polyurethanes (TPU), or polysulfides.

Depending on which thermoplastic polymer or thermoplastic polymer mixture is present in the molding composition, different amounts of plasticizer are required to achieve the desired thermoplastic properties. This can be determined by a few routine experiments. If the at least one thermoplastic polymer contained in the molding composition of the invention is not PVC, the content of the plasticizer composition of the invention in the molding composition is, in general, 0.5 to 300 phr (parts per hundred resin, i.e., parts by weight per hundred parts by weight of polymer), preferably 1.0 to 130 phr, more preferably 2.0 to 100 phr.

The at least one thermoplastic polymer present in the molding composition of the invention is especially polyvinyl chloride (PVC).

Polyvinyl chloride is obtained by homopolymerization of vinyl chloride. The polyvinyl chloride (PVC) used in accordance with the Invention may be prepared, for example, by suspension polymerization, microsuspension polymerization, emulsion polymerization, or bulk polymerization. The preparation of PVC by polymerization of vinyl chloride, and production and composition of plasticized PVC, are described in, for example, "Becker/Braun, Kunststoff-Handbuch, volume 2/1: Polyvinylchlorid", $2^{nd}$ edition, Carl Hanser Verlag, Munich.

For the PVC plasticized in accordance with the invention, the K value, which characterizes the molar mass of the PVC and is determined according to DIN 53726, is usually in the range of 57 and 90, preferably in the range of 61 and 85, more particularly in the range of 64 and 80.

For the purposes of the invention, the amount of PVC in the mixtures is 20 to 95 wt %, preferably 40 to 90 wt %, and more particularly 45 to 85 wt %.

Where the thermoplastic polymer in the molding compositions of the invention is polyvinyl chloride, the content of the plasticizer composition of the invention in the molding composition is, in general, 5.0 to 300 phr, preferably 15 to 150 phr and more preferably 30 to 120 phr.

A further subject of the present invention relates to molding compositions comprising an elastomer and a plasticizer composition of the invention.

The elastomer present in the molding compositions of the invention may be a natural rubber (NR) or a synthetically produced rubber, or mixtures thereof. Examples of preferred rubbers produced synthetically are polysoprene rubber (IR), styrene-butadiene rubber (SBR), butadiene rubber (BR), nitrile-butadiene rubber (NBR), or chloroprene rubber (CR).

Preferred rubbers or rubber mixtures are those which can be vulcanized with sulfur.

For the purposes of the invention, the amount of elastomer in the molding compositions of the invention is 20% to 95%, preferably 45% to 90% and more particularly 50% to 85% by weight, based on the overall weight of the molding compositions.

For the purposes of the invention, the molding compositions which comprise at least one elastomer may comprise other suitable adjuvants, in addition to the ingredients above. For example, there may be reinforcing fillers present, such as carbon black or silicon dioxide, further fillers, such as phenolic resins, vulcanizing or crosslinking agents, vulcanizing or crosslinking accelerators, activators, various types of oil, aging inhibitors, and other various adjuvants which are incorporated, for example, into tire compounds and other rubber compounds.

Where the polymer in the molding compositions of the invention comprises elastomers, especially rubbers, the content of the plasticizer composition of the invention, as defined above, in the molding composition is 1.0 to 60 phr, preferably 2.0 to 40 phr, more preferably 3.0 to 30 phr.

The polymer in the molding compositions of the invention may further comprise mixtures of PVC with an elastomer. As far as preferred elastomers suitable for this purpose are concerned, reference is made to the observations above. The amount of the elastomer in these polymer mixtures is customarily 1 to 50 wt %, preferably 3 to 40 wt %, more particularly 5 to 30 wt %.

Depending on the proportion of the elastomer in the polymer mixture, there may be great fluctuations in the amount of plasticizer composition of the invention in these molding compositions that is needed in order to achieve the desired properties.

The amount of the plasticizer composition of the Invention in these molding compositions is typically in the range of 0.5 to 300, preferably in the range of 1.0 to 150 phr, more preferably in the range of 2.0 to 120 phr.

Molding Composition Adjuvants

For the purposes of the invention, the molding compositions comprising at least one thermoplastic polymer may comprise other suitable adjuvants. Examples that may be present include stabilizers, lubricants, fillers, pigments, flame retardants, light stabilizers, blowing agents, polymeric processing assistants, impact tougheners, optical brighteners, antistats, or biostabilizers.

A number of suitable adjuvants are described in more detail below. The examples given, however, do not impose any restriction on the molding compositions of the invention, but instead serve merely for elucidation. All amount details are in wt % figures, based on the molding composition as a whole.

Stabilizers contemplated include all customary PVC stabilizers in solid and liquid form, examples being customary Ca/Zn, Ba/Zn, Pb or Sn stabilizers, and also acid-binding phyllosilicates.

The molding compositions of the invention may have a stabilizer content of 0.05% to 7%, preferably 0.1% to 5%, more preferably of 0.2% to 4%, and more particularly of 0.5% to 3%.

Lubricants reduce the adhesion between the plastics to be processed and metal surfaces and serve to counteract frictional forces during mixing, plastifying, and deforming.

The molding compositions of the invention may comprise, as lubricants, all lubricants customary for the processing of plastics. Examples of those contemplated include hydrocarbons, such as oils, paraffins, and PE waxes, fatty alcohols having 6 to 20 carbon atoms, ketones, carboxylic acids, such as fatty acids and montanic acid, oxidized PE wax, metal salts of carboxylic acids, carboxamides, and also carboxylic esters, examples being those with the alcohols ethanol, fatty alcohols, glycerol, ethanediol, pentaerythritol, and long-chain carboxylic acids as acid component.

The molding compositions of the invention may have a lubricant content of 0.01% to 10%, preferably 0.05% to 5%, more preferably of 0.1% to 3%, and more particularly of 0.2% to 2%.

Fillers influence in particular the compressive strength, tensile strength, and flexural strength, and also the hardness and heat distortion resistance, of plasticized PVC in a positive way.

For the purposes of the invention, the molding compositions may also comprise fillers, such as, for example, carbon black and other inorganic fillers, such as natural calcium carbonates, as for example chalk, limestone, and marble, synthetic calcium carbonates, dolomite, silicates, silica, sand, diatomaceous earth, aluminum silicates, such as kaolin, mica, and feldspar. Preferred fillers used are calcium carbonates, chalk, dolomite, kaolin, silicates, talc, or carbon black.

The molding compositions of the invention may have a filler content of 0.01% to 80%, preferably 0.1 to 60%, more preferably of 0.5 to 50%, and more particularly of 1% to 40%.

The molding compositions of the invention may also comprise pigments, in order to adapt the resulting product to different possible applications.

For the purposes of the present Invention, both inorganic pigments and organic pigments may be used. Inorganic pigments used may be, for example, cobalt pigments, such as $CoO/Al_2O_3$, and chromium pigments, as for example $Cr_2O_3$. Organic pigments contemplated include, for example, monoazo pigments, condensed azo pigments, azomethine pigments, anthraquinone pigments, quinacridones, phthalocyanine pigments, and dioxazine pigments.

The molding compositions of the invention may have a pigment content of 0.01% to 10%, preferably 0.05% to 5%, more preferably of 0.1% to 3%, and more particularly of 0.5% to 2%.

In order to reduce flammability and to reduce the level of smoke given off on burning, the molding compositions of the invention may also comprise flame retardants.

Examples of flame retardants which can be used include antimony trioxide, phosphate esters, chlorinated paraffin, aluminum hydroxide, and boron compounds.

The molding compositions of the invention may have a flame retardant content of 0.01% to 10%, preferably 0.1% to 8%, more preferably of 0.2% to 5%, and more particularly of 0.5% to 2%.

In order to protect articles produced from the molding compositions of the Invention from surface-region damage due to the influence of light, the molding compositions may also comprise light stabilizers, e.g. UV absorbers.

For the purposes of the present Invention it is possible to use hydroxybenzophenones, hydroxyphenylbenzotriazoles, cyanoacrylates or "hindered aminine light stabilizers" (HALS), such as the derivatives of 2,2,6,6-tetramethylpiperidine, for example, as light stabilizers.

The molding compositions of the Invention may have a light stabilizer content, e.g. UV absorber content, of 0.01% to 7%, preferably 0.1% to 5%, more preferably of 0.2% to 4%, and more particularly of 0.5% to 3%.

Preparation of the Compounds of the General Formula (I)

The polyester plasticizers of the invention are prepared in a manner which is conventional technically, as described in EP 1113034 B1, for example, by esterification of aliphatic dicarboxylic acids with diols in the presence of monohydric alcohols as capping groups, and of an esterification catalyst. The chain length or average molar weight of the polyester plasticizers is controlled via the addition ratio of the dicarboxylic acids and the dialcohols.

The dicarboxylic acids used in preparing the polyester plasticizers of the general formula (I) are preferably unbranched or branched $C_2$-$C_8$ alkyldicarboxylic acids, more preferably unbranched $C_2$-$C_5$ alkyldicarboxylic acids. The dicarboxylic acids used in preparing the polyester plasticizers of the general formula (I) are, more particularly, glutaric acid and/or adipic acid, especially adipic acid.

The diols used in preparing the polyester plasticizers of the general formula (I) are preferably unbranched or branched $C_2$-$C_8$ alkyldiols, more preferably unbranched and branched $C_2$-$C_8$ alkyldiols, such as, for example, 1,2-ethanediol, 1,2-propanediol, 1,3-propanediol, 1,2-butanediol, 1,3-butanediol, 1,4-butanediol, 2-methyl-1,3-propanediol, 1,2-pentanediol, 1,3-pentanediol, 1,4-pentanediol, 1,5-pentanediol, 2,2-dimethyl-1,3-propanediol, 1,2-hexanediol, 1,3-hexanediol, 1,4-hexanediol, 1,5-hexanediol, 1,6-hexanediol, 2-methyl-1,3-pentanediol, 1,7-hexanediol, 2,2-dimethyl-1,3-pentonediol or mixtures of these diols. More particularly, the diols used in preparing the polyester plasticizers of the general formula (I) are 1,2-propanediol, 1,3-butanediol, 1,4-butanedol, 2,2-dimethyl-1,3-propanedol, or mixtures of these diols.

The monohyric alcohols which are used as a chain cap in preparing the polyester plasticizers of the general formula (I) are preferably unbranched or branched $C_7$-$C_{12}$ alkanols or mixtures of unbranched or branched $C_7$-$C_{12}$ alkanols. These include n-heptanol, isoheptanol, n-octanol, isooctanol, 2-ethylhexanol, n-nonanol, isononanol, 2-propylhexanol, n-decanol, isodecanol, 2-propylheptanol, n-undecanol, isoundecanol, n-dodecanol, isododecanol, or mixtures of these alcohols. With particular preference the monohydric alcohols used in preparing the polyester plasticizers of the general formula (I), as chain termination, are n-octanol, isooctanol, 2-ethylhexanol, n-nonanol, isononanol, 2-propylhexanol, n-decanol, isodecanol, 2-propylheptanol or mixtures of these alcohols, and more particularly are n-octanol, isononanol, 2-propylheptanol, or mixtures of these alcohols.

The plasticizer composition of the invention especially comprises a compound of the general formula (I) prepared using the following starting materials:

adipic acid, 1,2-propanediol, and n-octanol, or adipic acid, 1,2-propanediol, 2,2-dimethyl-1,3-propanediol, and isononanol, or adipic acid, 1,4-butanediol, 2,2-dimethyl-1,3-propanediol and isononanol.

Esterification catalysts used are generally the catalysts customary for that purpose, examples being mineral acids, such as sulfuric acid and phosphoric acid; organic sulfonic acids, such as methanesulfonic acid and p-toluenesulfonic acid; amphoteric catalysts, more particularly compounds of titanium, tin(IV) compounds, or zirconium compounds, such as tetraalkoxytitaniums, e.g., tetrabutoxytitanium, and tin (IV) oxide.

The esterification catalyst is used an effective amount, which is typically in the range from 0.05 to 10 wt %, preferably 0.1 to 5 wt %, based on the sum of acid component and alcohol component.

Further suitable methods for preparing the compounds of the general formula (I) by means of esterification are described in, for example, U.S. Pat. No. 6,310,235, U.S. Pat. No. 5,324,853, DE-A 2612355 or DE-A 1945359.

The esterification may take place in general at ambient pressure or under reduced or elevated pressure. The esterification is preferably conducted at ambient pressure or reduced pressure.

The esterification can be carried out in the absence of an added solvent, or in the presence of an organic solvent which preferably forms an azeotrope with the water of esterification.

If the esterification is carried out in the presence of a solvent, the solvent in question is preferably an organic solvent which is inert under the reaction conditions. Such solvents include, for example, aliphatic hydrocarbons, halogenated aliphatic hydrocarbons, aromatic and substituted aromatic hydrocarbons, or ethers. The solvent is selected preferably from pentane, hexane, heptanes, ligroin, petroleum ether, cyclohexane, dichloromethane, trichloromethane, carbon tetrachloride, benzene, toluene, xylene, chlorobenzene, dichlorobenzenes, dibutyl ether, THF, dioxane, and mixtures thereof.

The esterification is carried out customarily within a temperature range from 50 to 250° C.

Where the esterification catalyst is selected from organic acids or mineral acids, the esterification is conducted typically in a temperature range from 50 to 160° C.

Where the esterification catalyst is selected from amphoteric catalysts, the esterification is carried out customarily within a temperature range from 100 to 250° C.

The esterification may take place in the presence or absence of an inert gas. An inert gas, generally speaking, is a gas which under the existing reaction conditions, does not enter into any reactions with reactants participating in the reaction, or with reagents, or with solvents, or with the products formed.

In one preferred embodiment, for example, adipic acid, 1,4-butanediol, neopentyl glycol, isononanol, and also isopropyl butyl titanate as esterification catalyst are charged to a reaction vessel, heated initially to 100° C. to 140° C., and homogenized by stirring. The reaction mixture is then heated at 160° C. to 190° C. under atmospheric pressure. The esterification, with elimination of water, begins at about 150° C. The water of reaction formed is separated off by distillation via a column. Alcohol components which have distilled over are separated off and returned. The reaction mixture is subsequently heated further to 200° C. to 250° C., a reduced pressure of 150 mbar to 300 mbar is applied, and further water of reaction is removed from the reaction mixture by passing nitrogen through it. The reaction mixture is stirred under reduced pressure and with nitrogen passed through it, at 200° C. to 250° C., until the acid number of the reaction mixture has reached a level of <15 mg KOH/g.

Subsequently, for final esterification, the reaction mixture is pumped into a second vessel and is stirred at 200° C. to 250° C., under a reduced pressure of 10 mbar to 150 mbar, and with removal of residual water and excess isononanol by the passing of an increased nitrogen stream through the reaction mixture, until the acid number of the reaction mixture has reached the level of <1.0 mg KOH/g. Thereafter the reaction product is also filtered at 100° C. to 140° C.

The aliphatic dicarboxylic acids, diols, and monohydric alcohols used in preparing the compounds of the general formula (I) may either be acquired commercially or prepared by synthesis routes that are known from the literature.

Commercially available polyester plasticizers may also be used as polyester plasticizers of the general formula (I). Examples of suitable commercially available polyester plasticizers are those available from BASF SE, Ludwigshafen under the brand name Palamoll® 638 (polyester plasticizer based on adipic acid, 1,2-propanediol and n-octanol), Palamoll® 652 (polyester plasticizer based on adipic acid, 1,2-propanediol, neopentyl glycol and isononanol), Palamoll® 654 (polyester plasticizer based on adipic acid, 1,4-butanediol, neopentyl glycol and isononanol) or Palamoll® 656 (polyester plasticizer based on adipic acid, 1,4-butanediol, neopentyl glycol and isononanol).

Compounds of the General Formula (II)

The compounds of the general formula (II) may be either acquired commercially or prepared by methods known in the prior art, as described, for example, in EP 1171413 B1.

In general, the ester compounds of the general formula (II) are prepared by esterification of corresponding aliphatic dicarboxylic acids with the corresponding aliphatic alcohols according to customary processes known to the skilled person, as already elucidated above for the preparation of the compounds of the general formula (I).

These include the reaction of at least one alcohol component, selected from the alcohols $R^2$—OH and $R^3$—OH, with a dicarboxylic acid of the general formula HO—C(=O)—Z—C(=O)—OH or a suitable derivative thereof. Suitable derivatives are, for example, the acyl halides, and acid anhydrides. A preferred acyl halide is the acyl chloride.

The ester compounds of the general formula (II) may also be prepared by transesterification of esters different from the esters of the general formula (II), with the corresponding aliphatic alcohols, by customary processes known to the skilled person.

These include the reaction of the di($C_1$-$C_4$)alkyl esters, more particularly of the dimethyl or diethyl esters, of the dicarboxylic acids HO—C(=O)—Z—C(=O)—OH with at least one alcohol $R^2$—OH and/or $R^3$—OH, or mixtures thereof, in the presence of a suitable transesterification catalyst.

Transesterification catalysts contemplated include the customary catalysts commonly used for transesterification reactions, these catalysts usually also being used for esterification reactions. They include, for example, mineral acids, such as sulfuric acid and phosphoric acid; organic sulfonic acids, such as methanesulfonic acid and p-toluenesulfonic acid; or specific metal catalysts from the group of the tin(IV) catalysts, examples being dialkyltin carboxylates such as dibutyltin diacetate, trialkyltin alkoxides, monoalkyltin compounds, such as monobutyltin dioxide, tin salts such as tin acetate or tin oxides; from the group of the titanium catalysts, monomeric and polymeric titanates and titanium chelates such as tetraethyl orthotitanate, tetrapropyl orthotitanate, tetrabutyl orthotitanate, triethanolamine titanate; from the group of the zirconium catalysts, zirconates and zirconium chelates such as tetrapropyl zirconate, tetrabutyl zirconate, triethanolamine zirconate; and also lithium catalysts such as lithium salts, lithium alkoxides; or aluminum (III), chromium(III), iron(III), cobalt(II), nickel(II), and zinc (II) acetylacetonate.

The amount of transesterification catalyst used is 0.05 to 5 wt %, preferably 0.10 to 1 wt %. The reaction mixture is heated preferably up to the boiling point of the reaction mixture, and so the reaction temperature, depending on the reactants, is between 20° C. and 200° C.

The transesterification may take place at ambient pressure or under reduced or elevated pressure. Preference is given to carrying out the transesterification under a pressure of 0.001 to 200 bar, more preferably 0.01 to 5 bar. The lower-boiling alcohol eliminated during the transesterification is preferably removed continuously by distillation, in order to shift the equilibrium in the transesterification reaction. The distillation column that is needed for this purpose is generally in direct connection with the transesterification reactor, and preferably is installed directly on said reactor. Where a plurality of transesterification reactors connected in series is used, each of these reactors may be equipped with a distillation column, or the alcohol mixture given off in vapor form, preferably from the last vessels in the transesterification reactor cascade, may be supplied via one or more collecting lines to a distillation column. The higher-boiling alcohol recovered in this distillation is preferably returned back to the transesterification.

Where an amphoteric catalyst is used, it is removed generally by hydrolysis and subsequent removal of the metal oxide formed, by filtration, for example. Preferably, after reaction has taken place, the catalyst is hydrolyzed by washing with water and the precipitated metal oxide is isolated by filtration. If desired, the filtrate may be subjected to further workup for the purpose of isolating and/or purifying the product. The product is preferably separated off by distillation.

The transesterification of the di($C_1$-$C_4$)alkyl esters, more particularly of the dimethyl or diethyl esters, of the dicarboxylic acids HO—C(=O)—Z—C(=O)—OH with at least one alcohol $R^2$—OH and/or $R^3$—OH or mixtures thereof takes place preferably in the presence of at least one titanium (IV) alkoxide. Preferred titanium(IV) alkoxides are tetrapropoxytitanium, tetrabutoxytitanium, or mixtures thereof. The alcohol component is preferably used in at least twice the stoichiometric amount, based on the di($C_1$-$C_4$ alkyl) esters employed.

The transesterification may be carried out in the absence or in the presence of an added organic solvent. The transesterification is carried out preferably in the presence of an inert organic solvent. Suitable organic solvents are those stated above for the esterification. They include especially toluene and THF.

The temperature during the transesterification is preferably in a range from 50 to 200° C.

The transesterification may take place in the absence or in the presence of an inert gas. An inert gas is taken generally to be a gas which under the prevailing reaction conditions does not enter into any reactions with the reactants involved in the reaction, reagents, solvents, or the products formed. The transesterification is carried out preferably without addition of an inert gas.

A common factor in the processes for preparing the compounds of the general formula (II) is that starting from the corresponding aliphatic dicarboxylic acids or suitable derivatives thereof, an esterification or transesterification is carried out, with the corresponding $C_4$-$C_{12}$ alkanols being used as reactants. These alcohols may be pure substances or isomer mixtures whose composition and degree of purity are dependent on the particular process by which they are prepared.

The $C_4$-$C_{12}$ alkanols which are used in preparing the compounds (II) present in the plasticizer composition may be straight-chain or branched or may consist of mixtures of straight-chain and branched $C_4$-$C_{12}$ alkanols. They include n-butanol, isobutanol, n-pentanol, isopentanol, n-hexanol, isohexanol, n-heptanol, isoheptanol, n-octanol, isooctanol, 2-ethylhexanol, n-nonanol, isononanol, isodecanol, 2-propylheptanol, n-undecanol, isoundecanol, n-dodecanol, or isododecanol. Preferred $C_7$-$C_{12}$-alkanols are 2-ethylhexanol, isononanol, and 2-propylheptanol, more particularly 2-ethylhexanol. The aliphatic dicarboxylic acids and aliphatic alcohols that are used in preparing the compounds of the general formula (II) may either be acquired commercially or be prepared by synthesis routes known from the literature.

The preferred $C_7$-$C_{12}$ alkanols used in preparing the compounds (I) and (II) present in the plasticizer composition of the invention may be straight-chain or branched or may consist of mixtures of straight-chain and branched $C_7$-$C_{12}$ alkanols. They include n-heptanol, isoheptanol, n-octanol, isooctanol, 2-ethylhexanol, n-nonanol, isononanol, isodecanol, 2-propylheptanol, n-undecanol, isoundecanol, n-dodecanol, or isododecanol. Particularly preferred $C_7$-$C_{12}$ alkanols are 2-ethylhexanol, isononanol, and 2-propylheptanol, more particularly isononanol.

Heptanol

Where heptanols are used in preparing the compounds of the general formulae (I) and (II), they may be straight-chain or branched or may consist of mixtures of straight-chain and branched heptanols. Preference is given to using mixtures of branched heptanols, also called isoheptanol, which are prepared by the rhodium-catalyzed, or preferably cobalt-catalyzed hydroformylation of dimer propene, obtainable for example by the Dimersol® process, and subsequent hydrogenation of the resulting isoheptanals to give an isoheptanol mixture. In accordance with its preparation, the isoheptanol mixture thus obtained consists of a plurality of isomers. Substantially straight-chain heptanols may be obtained by the rhodium-catalyzed or preferably cobalt-catalyzed hydroformylation of 1-hexene and subsequent hydrogenation of the resultant n-heptanal to n-heptanol. The hydroformylation of 1-hexene or dimer propene may take place according to processes known per se: In the case of the hydroformylation with rhodium catalysts dissolved homogeneously in the reaction medium, it is possible to use as catalyst not only noncomplexed rhodium carbonyls, which are formed in situ under the conditions of the hydroformylation reaction in the hydroformylation mixture under the action of synthesis gas, from rhodium salts, for example, but also complex rhodium carbonyl compounds, more particularly complexes with organic phosphines, such as triphenylphosphine, or organophosphates, preferably chelating biphosphites, as described in U.S. Pat. No. 5,288,918, for example. In the case of the cobalt-catalyzed hydroformylation of these olefins, cobalt carbonyl compounds are generally used which are homogeneously soluble in the reaction mixture and which form from cobalt salts under the conditions of the hydroformylation reaction under the action of synthesis gas.

Where the cobalt-catalyzed hydroformylation is performed in the presence of trialkyl- or triarylphosphines, the desired heptanols are formed directly as the hydroformylation product, meaning that there is no further need for hydrogenation of the aldehyde function.

Examples of suitable processes for the cobalt-catalyzed hydroformylation of the 1-hexene or of the hexene isomer mixtures are those industrially established processes elucidated in Falbe, New Syntheses with Carbon Monoxide, Springer, Berlin, 1980, on pages 162-168, such as the Ruhrchemie process, the BASF process, the Kuhlmann process, or the Shell process. While the Ruhrchemie, BASF, and Kuhlmann processes operate with non-ligand-modified cobalt carbonyl compounds as catalysts, and produce hexanal mixtures, the Shell process (DE-A 1593368) uses phosphine or phosphite ligand-modified cobalt carbonyl compounds as catalyst, which by virtue of their additional high hydrogenation activity lead directly to the hexanol mixtures.

Advantageous embodiments for the Implementation of the hydroformylation with non-ligand-modified cobalt carbonyl complexes are described in detail in DE-A 2139630, DE-A 2244373, DE-A 2404855, and WO 01014297.

The rhodium-catalyzed hydroformylation of 1-hexene or of the hexene isomer mixtures can use the established industrial low-pressure rhodium hydroformylation process with triphenylphosphine-ligand-modified rhodium carbonyl compounds, which is subject matter of U.S. Pat. No. 4,148,830. Non-ligand-modified rhodium carbonyl compounds can serve advantageously as catalyst for the rhodium-catalyzed hydroformylation of long-chain olefins, for example of the hexene isomer mixtures obtained by the processes described above; this differs from the low-pressure process in requiring a higher pressure of from 80 to 400 bar. The conduct of high-pressure rhodium hydroformylation processes of this type is described by way of example in EP-A 695734, EP-B 880494, and EP-B 1047655.

The isoheptanal mixtures obtained after hydroformylation of the hexene isomer mixtures are catalytically hydrogenated in a manner that is per se conventional to give isoheptanol mixtures. For this purpose it is preferable to use heterogeneous catalysts which comprise, as catalytically active component, metals and/or metal oxides of groups VI to VIII, or else of transition group I, of the Periodic Table of the Elements, in particular chromium, molybdenum, manganese, rhenium, iron, cobalt, nickel, and/or copper, optionally deposited on a support material such as $Al_2O_3$, $SiO_2$ and/or $TiO_2$.

Catalysts of this type are described by way of example in DE-A 3228881, DE-A 2628987, and DE-A 2445303. It is particularly advantageous to carry out the hydrogenation of the Isoheptanals with an excess of hydrogen of from 1.5 to 20% above the stoichiometric amount of hydrogen needed for the hydrogenation of the isoheptanals, at temperatures of from 50 to 200° C., and at a hydrogen pressure of from to 350 bar, and for avoidance of side-reactions to add, during the course of the hydrogenation, in accordance with DE-A 2628987, a small amount of water, advantageously in the form of an aqueous solution of an alkali metal hydroxide or alkali metal carbonate, in accordance with the teaching of WO 01087809.

Octanol

For many years, 2-ethylhexanol was the largest-production-quantity plasticizer alcohol, and it can be obtained through the aldol condensation of n-butyraldehyde to give 2-ethylhexenal and subsequent hydrogenation thereof to give 2-ethylhexanol (see Ullmann's Encyclopedia of Industrial Chemistry; $5^{th}$ edition, vol. A 10, pp. 137-140, VCH Verlagsgesellschaft GmbH, Weinheim 1987).

Substantially straight-chain octanols can be obtained via rhodium- or preferably cobalt-catalyzed hydroformylation of 1-heptene and subsequent hydrogenation of the resultant n-octanal to give n-octanol. The 1-heptene needed for this purpose can be obtained from the Fischer-Tropsch synthesis of hydrocarbons.

By virtue of the production route used for the alcohol isooctanol, it is not a unitary chemical compound, in contrast to 2-ethylhexanol or n-octanol, but instead is an isomer mixture of variously branched Ca alcohols, for example of 2,3-dimethyl-1-hexanol, 3,5-dimethyl-1-hexanol, 4,5-dimethyl-1-hexanol, 3-methyl-1-heptanol, and 5-methyl-1-heptanol; these can be present in the isooctanol in various quantitative proportions which depend on the production conditions and production processes used. Isooctanol is usually produced via codimerization of propene with butenes, preferably n-butenes, and subsequent hydroformylation of the resultant mixture of heptene isomers. The octanal Isomer mixture obtained in the hydroformylation can subsequently be hydrogenated to give the isooctanol in a manner that is conventional per se.

The codimerization of propene with butenes to give isomeric heptenes can advantageously be achieved with the aid of the homogeneously catalyzed Dimersol® process (Chauvin et al; Chem. Ind.; May 1974, pp. 375-378), which uses, as catalyst, a soluble nickel phosphine complex in the presence of an ethylaluminum chlorine compound, for example ethylaluminum dichloride. Examples of phosphine ligands that can be used for the nickel complex catalyst are tributylphosphine, triisopropyl-phosphine, tricyclohexyl-phosphine, and/or tribenzylphosphine. The reaction takes place at temperatures of from 0 to 80° C., and it is advantageous here to set a pressure at which the olefins are present in solution in the liquid reaction mixture (Cornils; Hermann: Applied Homogeneous Catalysis with Organometallic Compounds; $2^{nd}$ edition, vol. 1; pp. 254-259, Wiley-VCH, Weinheim 2002).

In an alternative to the Dimersol® process operated with nickel catalysts homogeneously dissolved in the reaction medium, the codimerization of propene with butenes can also be carried out with a heterogeneous NiO catalyst deposited on a support; heptene isomer distributions obtained here are similar to those obtained in the homogeneously catalyzed process. Catalysts of this type are by way of example used in what is known as the Octol® process (Hydrocarbon Processing, February 1986, pp. 31-33), and a specific heterogeneous nickel catalyst with good suitability for olefin dimerization or olefin codimerization is disclosed by way of example in WO 9514647.

Codimerization of propene with butenes can also use, instead of nickel-based catalysts, heterogeneous Brønsted-acid catalysts; heptenes obtained here are generally more highly branched than in the nickel-catalyzed processes. Examples of catalysts suitable for this purpose are solid phosphoric acid catalysts, e.g. phosphoric-acid-impregnated kieselguhr or diatomaceous earth, these being as utilized in the PolyGas® process for olefin dimerization or olefin oligomerization (Chitnis et al; Hydrocarbon Engineering 10, No. 6—June 2005). Brønsted-acid catalysts that have very good suitability for the codimerization of propene and butenes to give heptenes are zeolites, which are used in the EMOGAS® process, a further development based on the PolyGas® process.

The 1-heptene and the heptene isomer mixtures are converted to n-octanal and, respectively, octanal isomer mixtures by the known processes explained above in connection with the production of n-heptanal and heptanal isomer mixtures, by means of rhodium- or cobalt-catalyzed hydroformylation, preferably cobalt-catalyzed hydroformylation. These are then hydrogenated to give the corresponding octanols, for example by means of one of the catalysts mentioned above in connection with production of n-heptanol and of isoheptanol.

Nonanol

Substantially straight-chain nonanol can be obtained via rhodium- or preferably cobalt-catalyzed hydroformylation of 1-octene and subsequent hydrogenation of the resultant n-nonanal. The starting olefin 1-octene can be obtained by way of example by way of ethylene oligomerization by means of a nickel complex catalyst that is homogenously soluble in the reaction medium—1,4-butanediol—with, for example, diphenyl-phosphinoacetic acid or 2-diphenylphosphinobenzoic acid as ligand. This process is also known as the Shell Higher Olefins Process or SHOP process (see Welsermel, Arpe: Industrielle Organische Chemie [Industrial organic chemistry]; $5^{th}$ edition, p. 96; Wiley-VCH, Weinheim 1998).

Isononanol, which is used for the synthesis of the diisononyl esters of the general formulae (I) and (II) comprised in the plasticizer composition of the invention, is not a unitary chemical compound, but instead is a mixture of variously branched, isomeric $C_9$-alcohols which can have various degrees of branching depending on the manner in which they were produced, and also in particular on the starting materials used. The isononanols are generally produced via dimerization of butenes to give isooctene mixtures, subsequent hydroformylation of the Isooctene mixtures, and hydrogenation of the resultant isononanal mixtures to give isononanol mixtures, as explained in Ulmann's Encyclopedia of Industrial Chemistry, $5^{th}$ edition, vol. A1, pp. 291-292, VCH Verlagsgesellschaft GmbH, Weinhem 1995.

Isobutene, cis- and trans-2-butene, and also 1-butene, or a mixture of these butene isomers, can be used as starting material for the production of the isononanols. The dimerization of pure isobutene, mainly catalyzed by means of liquid Brønsted acids, e.g., sulfuric acid or phosphoric acid, or by means of solid Brønsted acids, e.g., phosphoric acid applied to kieselguhr, $SiO_2$, or $Al_2O_3$, as support material, or zeolites or mainly gives the highly branched compound 2,4,4-trimethylpentene, also termed diisobutylene, which gives highly branched isononanols after hydroformylation and hydrogenation of the aldehyde.

Preference is given to isononanols with a low degree of branching. Isononanol mixtures of this type with little branching are prepared from the linear butenes 1-butene, cis- and/or trans-2-butene, which optionally can also comprise relatively small amounts of isobutene, by way of the route described above involving butene dimerization, hydroformylation of the isooctene, and hydrogenation of the resultant isononanal mixtures. A preferred raw material is what is known as raffinate II, which is obtained from the $C_4$ cut of a cracker, for example of a steam cracker, after elimination of allenes, acetylenes, and dienes, in particular 1,3-butadiene, via partial hydrogenation thereof to give linear butenes, or removal thereof via extractive distillation, for example by means of N-methylpyrrolidone, and subsequent Brønsted-acid catalyzed removal of the isobutene comprised therein via reaction thereof with methanol or isobutanol by established large-scale-industrial processes with formation of the fuel additive methyl tert-butyl ether (MTBE), or of the isobutyl tert-butyl ether that is used to obtain pure isobutene.

Raffinate II also comprises, alongside 1-butene and cis- and trans-2-butene, n- and isobutane, and residual amounts of up to 5% by weight of isobutene.

The dimerization of the linear butenes or of the butene mixture comprised in raffinate II can be carried out by means of the familiar processes used on a large industrial scale, for example those explained above in connection with the production of isoheptene mixtures, for example by means of heterogeneous, Brønsted-acid catalysts such as those used in the PolyGas® process or EMOGAS® process, by means of the Dimersol® process with use of nickel complex catalysts homogeneously dissolved in the reaction medium, or by means of heterogeneous, nickel(II)-oxide-containing catalysts by the Octol® process or by the process of WO 9514647. The resultant isooctene mixtures are converted to isononanal mixtures by the known processes explained above in connection with the production of heptanal isomer mixtures, by means of rhodium or cobalt-catalyzed hydroformylation, preferably cobalt-catalyzed hydroformylation. These are then hydrogenated to give the suitable isononanol mixtures, for example by means of one of the catalysts mentioned above in connection with the production of isoheptanol.

The resultant isononanol isomer mixtures can be characterized by way of their iso-index, which can be calculated from the degree of branching of the individual, isomeric isononanol components in the isononanol mixture multiplied by the percentage proportion of these in the isononanol mixture: by way of example, n-nonanol contributes the value 0 to the iso-index of an isononanol mixture, methyloctanols (single branching) contribute the value 1, and dimethylheptanols (double branching) contribute the value 2. The higher the linearity, the lower the iso-index of the relevant isononanol mixture. Accordingly, the iso-index of an isononanol mixture can be determined via gas-chromatographic separation of the isononanol mixture into its individual Isomers and attendant quantification of the percentage quantitative proportion of these in the Isononanol mixture, determined by standard methods of gas-chromatographic analysis. In order to increase the volatility of the isomeric nonanols and improve the gas-chromatographic separation of these, they are advantageously trimethylsilylated by means of standard methods, for example via reaction with N-methyl-N-trimethylsilyltrifluoroacetamide, prior to gas-chromatographic analysis. In order to achieve maximum quality of separation of the Individual components during gas-chromatographic analysis, it is preferable to use capillary columns with polydimethylsiloxane as stationary phase. Capillary columns of this type are obtainable commercially, and a little routine experimentation by the person skilled in the art is all that is needed in order to select, from the many different products available commercially, one that has ideal suitability for this separation task.

The dilsononyl esters of the general formulae (I) and (II) used in the plasticizer composition of the Invention have generally been esterified with isononanols with an iso index of from 0.8 to 2, preferably from 1.0 to 1.8, and particularly preferably from 1.1 to 1.5, which can be produced by the abovementioned processes.

Possible compositions of isononanol mixtures that can be used for the production of the compounds of the general formulae (I) and (II) used in accordance with the invention are stated below merely by way of example, and it should be noted here that the proportions of the isomers individually listed within the Isononanol mixture can vary, depending on the composition of starting material, for example raffinate II, the composition of butenes in which can vary with the production process, and on variations in the production conditions used, for example the age of the catalysts utilized, and conditions of temperature and of pressure, which have to be adjusted appropriately thereto.

By way of example, an Isononanol mixture produced via cobalt-catalyzed hydroformylation and subsequent hydrogenation from an isooctene mixture produced with use of raffinate II as raw material by means of the catalyst and process in accordance with WO 9514647 can have the following composition:

from 1.73 to 3.73% by weight, preferably from 1.93 to 3.53% by weight, particularly preferably from 2.23 to 3.23% by weight of 3-ethyl-6-methyl-hexanol;

from 0.38 to 1.38% by weight, preferably from 0.48 to 1.28% by weight, particularly preferably from 0.58 to 1.18% by weight of 2,6-dimethylheptanol;

from 2.78 to 4.78% by weight, preferably from 2.98 to 4.58% by weight, particularly preferably from 3.28 to 4.28% by weight of 3,5-dimethylheptanol;

from 6.30 to 16.30% by weight, preferably from 7.30 to 15.30% by weight, particularly preferably from 8.30 to 14.30% by weight of 3,6-dimethylheptanol;

from 5.74 to 11.74% by weight, preferably from 6.24 to 11.24% by weight, particularly preferably from 6.74 to 10.74% by weight of 4,6-dimethylheptanol;

from 1.64 to 3.64% by weight, preferably from 1.84 to 3.44% by weight, particularly preferably from 2.14 to 3.14% by weight of 3,4,5-trimethylhexanol;

from 1.47 to 5.47% by weight, preferably from 1.97 to 4.97% by weight, particularly preferably from 2.47 to 4.47% by weight of 3,4,5-trimethylhexanol, 3-methyl-4-ethylhexanol and 3-ethyl-4-methylhexanol;

from 4.00 to 10.00% by weight, preferably from 4.50 to 9.50% by weight, particularly preferably from 5.00 to 9.00% by weight of 3,4-dimethylheptanol;

from 0.99 to 2.99% by weight, preferably from 1.19 to 2.79% by weight, particularly preferably from 1.49 to 2.49% by weight of 4-ethyl-5-methylhexanol and 3-ethylheptanol;
from 2.45 to 8.45% by weight, preferably from 2.95 to 7.95% by weight, particularly preferably from 3.45 to 7.45% by weight of 4,5-dimethylheptanol and 3-methyloctanol;
from 1.21 to 5.21% by weight, preferably from 1.71 to 4.71% by weight, particularly preferably from 2.21 to 4.21% by weight of 4,5-dimethylheptanol;
from 1.55 to 5.55% by weight, preferably from 2.05 to 5.05% by weight, particularly preferably from 2.55 to 4.55% by weight of 5,6-dimethylheptanol;
from 1.63 to 3.63% by weight, preferably from 1.83 to 3.43% by weight, particularly preferably from 2.13 to 3.13% by weight of 4-methyloctanol;
from 0.98 to 2.98% by weight, preferably from 1.18 to 2.78% by weight, particularly preferably from 1.48 to 2.48% by weight of 5-methyloctanol;
from 0.70 to 2.70% by weight, preferably from 0.90 to 2.50% by weight, particularly preferably from 1.20 to 2.20% by weight of 3,6,6-trimethylhexanol;
from 1.96 to 3.96% by weight, preferably from 2.16 to 3.76% by weight, particularly preferably from 2.46 to 3.46% by weight of 7-methyloctanol;
from 1.24 to 3.24% by weight, preferably from 1.44 to 3.04% by weight, particularly preferably from 1.74 to 2.74% by weight of 6-methyloctanol;
from 0.1 to 3% by weight, preferably from 0.2 to 2% by weight, particularly preferably from 0.3 to 1% by weight of n-nonanol;
from 25 to 35% by weight, preferably from 28 to 33% by weight, particularly preferably from 29 to 32% by weight of other alcohols having 9 and 10 carbon atoms; with the proviso that the entirety of the components mentioned gives 100% by weight.

In accordance with what has been said above, an isononanol mixture produced via cobalt-catalyzed hydroformylation and subsequent hydrogenation with use of an isooctene mixture produced by means of the PolyGas® process or EMOGAS® process with an ethylene-containing butene mixture as raw material can vary within the range of the compositions below, depending on the composition of the raw material and variations in the reaction conditions used:
from 6.0 to 16.0% by weight, preferably from 7.0 to 15.0% by weight, particularly preferably from 8.0 to 14.0% by weight of n-nonanol;
from 12.8 to 28.8% by weight, preferably from 14.8 to 26.8% by weight, particularly preferably from 15.8 to 25.8% by weight of 6-methyloctanol;
from 12.5 to 28.8% by weight, preferably from 14.5 to 26.5% by weight, particularly preferably from 15.5 to 25.5% by weight of 4-methyloctanol;
from 3.3 to 7.3% by weight, preferably from 3.8 to 6.8% by weight, particularly preferably from 4.3 to 6.3% by weight of 2-methyloctanol;
from 5.7 to 11.7% by weight, preferably from 6.3 to 11.3% by weight, particularly preferably from 6.7 to 10.7% by weight of 3-ethylheptanol;
from 1.9 to 3.9% by weight, preferably from 2.1 to 3.7% by weight, particularly preferably from 2.4 to 3.4% by weight of 2-ethylheptanol;
from 1.7 to 3.7% by weight, preferably from 1.9 to 3.5% by weight, particularly preferably from 2.2 to 3.2% by weight of 2-propylhexanol;
from 3.2 to 9.2% by weight, preferably from 3.7 to 8.7% by weight, particularly preferably from 4.2 to 8.2% by weight of 3,5-dimethylheptanol;
from 6.0 to 16.0% by weight, preferably from 7.0 to 15.0% by weight, particularly preferably from 8.0 to 14.0% by weight of 2,5-dimethylheptanol;
from 1.8 to 3.8% by weight, preferably from 2.0 to 3.6% by weight, particularly preferably from 2.3 to 3.3% by weight of 2,3-dimethylheptanol;
from 0.6 to 2.6% by weight, preferably from 0.8 to 2.4% by weight, particularly preferably from 1.1 to 2.1% by weight of 3-ethyl-4-methylhexanol;
from 2.0 to 4.0% by weight, preferably from 2.2 to 3.8% by weight, particularly preferably from 2.5 to 3.5% by weight of 2-ethyl-4-methylhexanol;
from 0.5 to 6.5% by weight, preferably from 1.5 to 6% by weight, particularly preferably from 1.5 to 5.5% by weight of other alcohols having 9 carbon atoms; with the proviso that the entirety of the components mentioned gives 100% by weight.

Decanol

Isodecanol, which is used for the synthesis of the diisodecyl esters of the general formulae (I) and (II) comprised in the plasticizer composition of the invention, is not a unitary chemical compound, but instead is a complex mixture of differently branched isomeric decanols.

These are generally produced via nickel- or Brønsted-acid-catalyzed trimerization of propylene, for example by the PolyGas® process or the EMOGAS® process explained above, subsequent hydroformylation of the resultant isononene isomer mixture by means of homogeneous rhodium or cobalt carbonyl catalysts, preferably by means of cobalt carbonyl catalysts, and hydrogenation of the resultant isodecanal isomer mixture, e.g. by means of the catalysts and processes mentioned above in connection with the production of $C_7$-$C_9$-alcohols (Ullmann's Encyclopedia of Industrial Chemistry; $5^{th}$ edition, vol. A1, p. 293, VCH Veragsgesellschaft GmbH, Weinheim 1985). The resultant isodecanol generally has a high degree of branching.

2-Propylheptanol, which is used for the synthesis of the di(2-propylheptyl) esters of the general formulae (I) and (II) comprised in the plasticizer composition of the invention, can be pure 2-propylheptanol or can be propylheptanol isomer mixtures of the type generally formed during the Industrial production of 2-propylheptanol and likewise generally termed 2-propylheptanol.

Pure 2-propylheptanol can be obtained via aldol condensation of n-valeraldehyde and subsequent hydrogenation of the resultant 2-propylheptanal, for example in accordance with U.S. Pat. No. 2,921,089. By virtue of the production process, commercially obtainable 2-propylheptanol generally comprises, alongside the main component 2-propylheptanol, one or more of the following isomers of 2-propylheptanol: 2-propyl-4-methylhexanol, 2-propyl-5-methylhexanol, 2-isopropylheptanol, 2-isopropyl-4-methylhexanol, 2-isopropyl-5-methylhexanol, and/or 2-propyl-4,4-dimethylpentanol. The presence of other isomers of 2-propylheptanol, for example 2-ethyl-2,4-dimethylhexanol, 2-ethyl-2-methylheptanol, and/or 2-ethyl-2,5-dimethylhexanol, in the 2-propylheptanol is possible, but because the rates of formation of the aldehydic precursors of these isomers in the aldol condensation are low, the amounts of these present in the 2-propylheptanol are only trace amounts, if they are present at all, and they play practically no part in determining the plasticizer properties of the compounds produced from these 2-propylheptanol isomer mixtures.

Various hydrocarbon sources can be utilized as starting material for the production of 2-propylheptanol, for example 1-butene, 2-butene, raffinate I—an alkane/alkene mixture which is obtained from the $C_4$ cut of a cracker after removal of allenes, of acetylenes, and of dienes and which also comprises, alongside 1- and 2-butene, considerable amounts of isobutene—or raffinate II, which is obtained from raffinate I via removal of isobutene and then comprises, as olefin components other than 1- and 2-butene, only small proportions of isobutene. It is also possible, of course, to use mixtures of raffinate I and raffinate II as raw material for the production of 2-propylheptanol. These olefins or olefin mixtures can be hydroformylated by methods that are conventional per se with cobalt or rhodium catalysts, and 1-butene here gives a mixture of n- and isovaleraldehyde—the term isovaleraldehyde designating the compound 2-methylbutanal, the n/iso ratio of which can vary within relatively wide limits, depending on catalyst used and on hydroformylation conditions. By way of example, when a triphenylphosphine-modified homogeneous rhodium catalyst (Rh/TPP) is used, n- and isovaleraldehyde are formed in an n/iso ratio that is generally from 10:1 to 20:1 from 1-butene, whereas when rhodium hydroformylation catalysts modified with phosphite ligands are used, for example in accordance with U.S. Pat. No. 5,288,918 or WO 05028407, or when rhodium hydroformylation catalysts modified with phosphoamidite ligands are used, for example in accordance with WO 0283695, n-valeraldehyde is formed almost exclusively. While the Rh/TPP catalyst system converts 2-butene only very slowly in the hydroformylation, and most of the 2-butene can therefore be reclaimed from the hydroformylation mixture, 2-butene is successfully hydroformylated with the phosphite-ligand- or phosphorus amidite ligand-modified rhodium catalysts mentioned, the main product formed being n-valeraldehyde. In contrast, isobutene comprised within the olefinic raw material is hydroformylated at varying rates by practically all catalyst systems to 3-methylbutanal and, in the case of some catalysts, to a lesser extent to pivalaldehyde.

The $C_5$ aldehydes obtained in accordance with starting materials and catalysts used, i.e., n-valeraldehyde optionally mixed with isovaleraldehyde, 3-methylbutanal, and/or pivalaldehyde, can be separated, if desired, completely or to some extent by distillation into the individual components prior to the aldol condensation, and here again there is therefore a possibility of influencing and of controlling the composition of isomers of the $C_{10}$ alcohol component of the ester mixtures used in the process of the invention.

Equally, it is possible that the $C_5$ aldehyde mixture formed during the hydroformylation is introduced into the aldol condensation without prior isolation of individual isomers. If n-valeraldehyde is used in the aldol condensation, which can be carried out by means of a basic catalyst, for example an aqueous solution of sodium hydroxide or of potassium hydroxide, for example by the processes described in EP-A 366089, U.S. Pat. No. 4,426,524, or U.S. Pat. No. 5,434,313, 2-propylheptanal is produced as sole condensate, whereas if a mixture of isomeric $C_6$ aldehydes is used the product comprises an isomer mixture of the products of the homoaldol condensation of identical aldehyde molecules and of the crossed aldol condensation of different valeraldehyde isomers. The aldol condensation can, of course, be controlled via targeted reaction of individual isomers in such a way that a single aldol condensation isomer is formed predominantly or entirely.

The relevant aldol condensates can then be hydrogenated with conventional hydrogenation catalysts, for example those mentioned above for the hydrogenation of aldehydes, to give the corresponding alcohols or alcohol mixtures, usually after preceding, preferably distillative isolation from the reaction mixture and, if desired, distillative purification.

As mentioned above, the compounds of the general formulae (I) and (II) comprised in the plasticizer composition of the invention can have been esterified with pure 2-propylheptanol. However, production of said esters generally uses mixtures of 2-propylheptanol with the propylheptanol isomers mentioned in which the content of 2-propylheptanol is at least 50% by weight, preferably from 60 to 98% by weight, and particularly preferably from 80 to 95% by weight, in particular from 85 to 95% by weight.

Suitable mixtures of 2-propylheptanol with the propylheptanol Isomers comprise by way of example those of from 60 to 98% by weight of 2-propylheptanol, from 1 to 15% by weight of 2-propyl-4-methylhexanol, and from 0.01 to 20% by weight of 2-propyl-5-methylhexanol, and from 0.01 to 24% by weight of 2-isopropylheptanol, where the sum of the proportions of the individual constituents does not exceed 100% by weight. It is preferable that the proportions of the Individual constituents give a total of 100% by weight.

Other suitable mixtures of 2-propylheptanol with the propylheptanol isomers comprise by way of example those of from 75 to 95% by weight of 2-propylheptanol, from 2 to 15% by weight of 2-propyl-4-methylhexanol, from 1 to 20% by weight of 2-propyl-5-methylhexanol, from 0.1 to 4% by weight of 2-isopropylheptanol, from 0.1 to 2% by weight of 2-isopropyl-4-methylhexanol, and from 0.1 to 2% by weight of 2-isopropyl-5-methylhexanol, where the sum of the proportions of the individual constituents does not exceed 100% by weight. It is preferable that the proportions of the individual constituents give a total of 100% by weight.

Preferred mixtures of 2-propylheptanol with the propylheptanol Isomers comprise those with from 85 to 95% by weight of 2-propylheptanol, from 5 to 12% by weight of 2-propyl-4-methylhexanol, and from 0.1 to 2% by weight of 2-propyl-5-methylhexanol, and from 0.01 to 1% by weight of 2-isopropylheptanol, where the sum of the proportions of the individual constituents does not exceed 100% by weight. It is preferable that the proportions of the Individual constituents give a total of 100% by weight.

When the 2-propylheptanol Isomer mixtures mentioned are used Instead of pure 2-propylheptanol for the production of the compounds of the general formula (I) and (II), the isomer composition of the alkyl ester groups and, respectively, alkyl ether groups corresponds in practical terms to the composition of the propylheptanol isomer mixtures used for the esterification.

Undecanol

The undecanols which are used for the production of the compounds of the general formulae (I) and (II) comprised in the plasticizer composition of the invention, can be straight-chain or branched, or can be composed of mixtures of straight-chain and branched undecanols. It is preferable to use, as alcohol component, mixtures of branched undecanols, also termed isoundecanol.

Substantially straight-chain undecanol can be obtained via rhodium- or preferably cobalt-catalyzed hydroformylation of 1-decene and subsequent hydrogenation of the resultant n-undecanal. The starting olefin 1-decene is produced by way of the SHOP process mentioned previously for the production of 1-octene.

For the production of branched isoundecanol, the 1-decene obtained in the SHOP process can be subjected to skeletal isomerization, for example by means of acidic zeolitic molecular sieves, as described in WO 9823566, in which case mixtures of isomeric decenes are formed, rhodium- or preferably cobalt-catalyzed hydroformylation of which, with subsequent hydrogenation of the resultant isoundecanal mixtures, gives the isoundecanol used for preparing the compounds (I) and (II) used according to the invention. Hydroformylation of 1-decene or of isodecene mixtures by means of rhodium or cobalt catalysis can be achieved as described previously in connection with the synthesis of $C_7$-$C_{10}$ alcohols. Similar considerations apply to the hydrogenation of n-undecanal or of isoundecanal mixtures to give n-undecanol and, respectively, isoundecanol.

After distillative purification of the hydrogenation product, the resultant $C_7$-$C_{11}$ alkyl alcohols or a mixture of these can be used as described above for the production of the compounds (I) or diester compounds of the general formula (II) used in the invention.

Dodecanol

Substantially straight-chain dodecanol can be obtained advantageously by way of the Alfol® process or Epal® process. These processes include the oxidation and hydrolysis of straight-chain trialkylaluminum compounds which are constructed stepwise by way of a plurality of ethylation reactions, starting from triethylaluminum, with use of Ziegler-Natta catalysts. The desired n-dodecanol can be obtained from the resultant mixtures of substantially straight-chain alkyl alcohols of varying chain length after distillative discharge of the $C_{12}$ alkyl alcohol fraction.

Alternatively, n-dodecanol can also be produced via hydrogenation of natural fatty acid methyl esters, for example from coconut oil.

Branched isododecanol can be obtained by analogy with the known processes for the codimerization and/or oligomerization of olefins, as described, for example, in WO 0063151, with subsequent hydroformylation and hydrogenation of the isoundecene mixtures, as described, for example, in DE-A 4339713. After distillative purification of the hydrogenation product, the resultant isododecanols or mixtures of these can be used as described above for the production of the compounds (I) or diester compounds of the general formula (II) used in the invention.

Molding Composition Applications

The molding composition of the invention is preferably used for the production of moldings and foils. Among these are in particular housings of electrical devices, for example of kitchen appliances, and computer housings; tooling; equipment; piping; cables; hoses, for example plastics hoses, water hoses and irrigation hoses, industrial rubber hoses, or chemicals hoses; wire sheathing; window profiles; plastics profiles for conveying apparatuses, such as plastics profiles for conveyor belts, for example; vehicle-construction components, for example bodywork constituents, vibration dampers for engines; tires; furniture, for example chairs, tables, or shelving; cushion foam and mattress foam; tarpaulins, for example truck tarpaulins or tenting; roofing felt; gaskets; composite foils, such as foils for laminated safety glass, in particular for vehicle windows and/or window panes; self-adhesive films; laminating films; recording disks; synthetic leather; packaging containers; adhesive-tape foils, or coatings.

The molding composition of the invention is also suitable for the production of moldings and foils which come directly into contact with people or with foods. These are primarily medical products, hygiene products, packaging for food or drink, products for the interior sector, toys and child-care items, sports-and-leisure products, apparel or fibers for textiles, and the like.

The medical products which can be produced from the molding composition of the Invention are by way of example tubes for enteral nutrition and hemodialysis, breathing tubes, infusion tubes, infusion bags, blood bags, catheters, tracheal tubes, disposable syringes, gloves, or breathing masks.

The packaging that can be produced from the molding composition of the invention for food or drink is by way of example freshness-retention foils, food-or-drink hoses, drinking-water hoses, containers for storing or freezing food or drink, lid gaskets, closure caps, crown corks, or synthetic corks for wine.

The products which can be produced from the molding composition of the invention for the interior sector are by way of example ground-coverings, which can be of homogeneous structure or can be composed of a plurality of layers, for example of at least one foamed layer, examples being floorcoverings, sports floors, or luxury vinyl tiles (LVTs), synthetic leathers, wallcoverings, or foamed or unfoamed wallpapers, in buildings, or can be cladding or console covers in vehicles.

The toys and child-care items which can be produced from the molding composition of the invention are by way of example dolls, inflatable toys, such as balls, toy figures, toy animals, anatomical models for education, modeling clays, swimming aids, stroller covers, baby-changing mats, bedwarmers, teething rings, or bottles.

The sports-and-leisure products that can be produced from the molding composition of the invention are by way of example gymnastics balls or other balls, exercise mats, seat cushions, massage balls and massage rollers, shoes and shoe soles, air mattresses, or drinking bottles.

The apparel that can be produced from the molding compositions of the invention is by way of example (coated) textiles, such as latex clothing, protective apparel or rainwear, such as rain jackets, or rubber boots.

Non-PVC Applications

The present invention also includes the use of the plasticizer composition of the invention as and/or in auxiliaries selected from: calendering auxiliaries; rheology auxiliaries; surfactant compositions, such as flow aids and film-forming aids, defoamers, antifoams, wetting agents, coalescing agents, and emulsifiers; lubricants, such as lubricating oils, lubricating greases, and lubricating pastes; quenchers for chemical reactions; phlegmatizing agents; pharmaceutical products; plasticizers in adhesives or sealants; impact modifiers, and standardizing additives.

The examples and the figures described below provide further explanation of the invention. These examples and figures are not to be understood as restricting the invention.

The examples and figures hereinafter use the following abbreviations:

phr stands for parts by weight per 100 parts by weight of polymer.

DESCRIPTION OF FIGURES

FIG. 1:

FIG. 1 shows the plasticizer compatibility of flexible PVC foils containing 100 phr of plasticizer compositions which comprise Palamoll® 638 and Plastomoll® DOA in different proportions, and also, for comparison, flexible PVC foils containing exclusively the commercially available plasticizer Plastomoll® DOA or Palamoll® 638. The variable shown is the loss of dry weight [percent] as a function of the test duration (storage time) [days].

Figure 2:
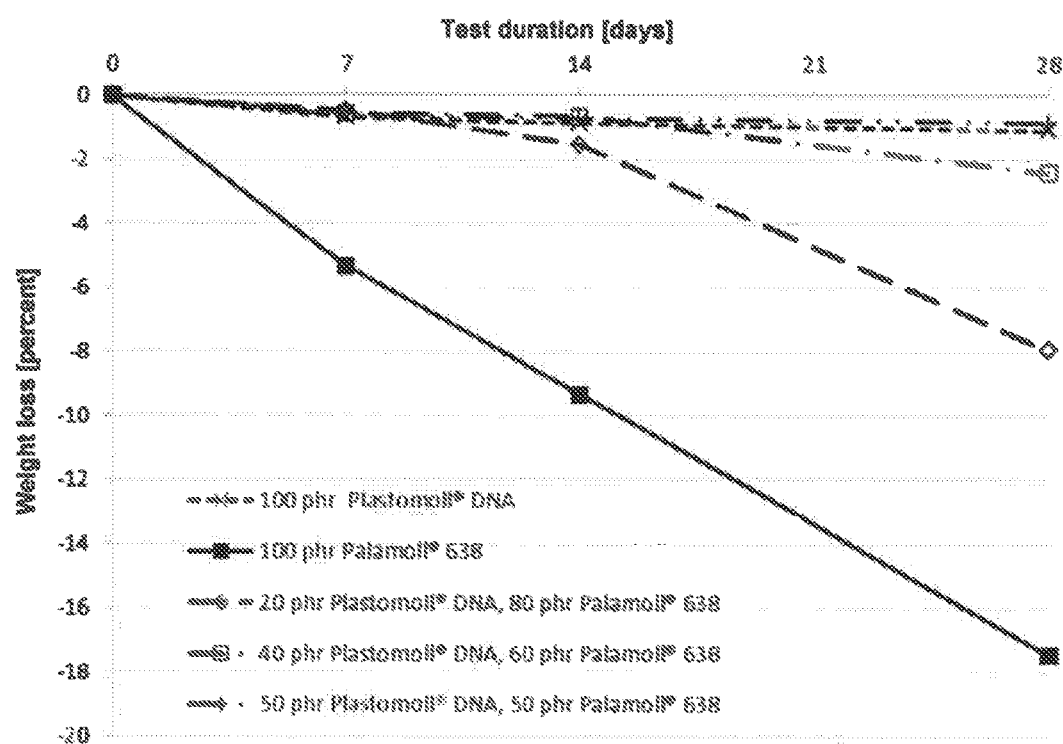
FIG. 2 shows the plasticizer compatibility of flexible PVC foils containing 100 phr of plasticizer compositions which comprise Palamoll® 638 and Plastomoll® DNA in different proportions, and also, for comparison, flexible PVC foils containing exclusively the commercially available plasticizer Plastomoll® DNA or Palamoll® 638. The variable shown is the loss of dry weight [percent] as a function of the test duration (storage time) [days].

FIG. 2:

FIG. 2 shows the plasticizer compatibility of flexible PVC foils containing 100 phr of plasticizer compositions which comprise Palamoll® 638 and Plastomoll® DNA in different proportions, and also, for comparison, flexible PVC foils containing exclusively the commercially available plasticizer Plastomoll® DNA or Palamoll® 638. The variable shown is the loss of dry weight [percent] as a function of the test duration (storage time) [days].

EXAMPLES

Ingredients used in the examples are as follows:

| Ingredient | Manufacturer |
| --- | --- |
| Suspension-PVC, brand name Solvin® 271 SP | SolVin SA, Brussels, Belgium |
| Polyester plasticizer based on adipic acid, 1,2-propanediol, and n-octanol, brand name Palamoll® 638 | BASF SE, Ludwigshafen, Germany |
| Di(2-ethylhexyl) adipate, brand name Plastomoll® DOA | BASF SE, Ludwigshafen, Germany |
| Di(isononyl) adipate, brand name Plastomoll® DNA | BASF SE, Ludwigshafen, Germany |
| Ba—Zn stabilizer, brand name Reagens® SLX/781 | Reagens S.p.A., Bologna, Italy |

I) Preparation Examples

I.a) Preparation of the Polymer Plasticizer Palamoll® 638 (Polymer Plasticizer Based on Adipic Acid, 1,2-Propanediol and n-Octanol)

6500 kg of adipic acid (commercially available product, available for example from BASF SE, Ludwigshafen), 3207 kg of 1,2-propanediol (commercially available product, available for example from BASF SE, Ludwigshafen), 1170 kg of n-octanol (commercially available product, available for example from Sasol, Johannesburg, South Africa) and 0.5 kg of isopropyl n-butyl titanate (commercially available product, available for example from DuPont, Wilmington, US) were charged to a 15 m³ reaction vessel, and this initial charge was heated to 130° C. and homogenized by stirring. The reaction mixture was then heated to 175° C. under atmospheric pressure and stirred for 4 hours. The esterification, accompanied by elimination of water, began at about 150° C. The water of reaction formed was removed by distillation via a column. 1,2-Propanediol and n-octanol which had distilled over were separated off and returned. The reaction mixture was then heated to 230° C., a reduced pressure of 200 mbar was applied, and further water of the reaction was removed from the reaction mixture via passing nitrogen through the mixture (2 m³/h). After a total of 22 hours of stirring under these reaction conditions, the acid number of the reaction mixture had dropped to a level of <15 mg KOH/g. The reaction mixture was then stirred at 230° C. and 100 mbar. An increased stream of nitrogen of 30 ma/h was passed through the reaction mixture at this stage, removing residual water and excess n-octanol. After 10 hours of stirring under these reaction conditions, the acid number of the reaction mixture dropped to a level of <1 mg KOH/g. Thereafter the reaction product was filtered at 120° C., primarily in order to remove insoluble products derived from the catalyst.

The plasticizer prepared in this way was composed of 49 mol % of adipic acid units, 42 mol % of 1,2-propanediol units and 9 mol % of n-octanol units. The plasticizer had a density at 20° C. of 1.12 g/cm³, a dynamic viscosity at 20° C. of 9000 mPa's and a refractive index nD20 of 1.467.

I.b) Preparation of the Plasticizer Plastomoll® DOA (Di-(2-Ethylhexyl) Adipate)

The preparation was accomplished by esterifying 782 g of 2-ethylhexanol (commercially available product, available for example from Oxea, Oberhausen), (20% excess relative to adipic acid) with 365 g of adipic acid (commercially available product, available for example from BASF SE, Ludwigshafen) and 0.42 g of isopropyl butyl titanate as catalyst (commercially available product, available for example from DuPont, Wilmington, US) in a 2 l autoclave with $N_2$ sparging (10 l/h) at a stirring speed of 500 rpm and a reaction temperature of 230° C. The water of reaction formed was removed continuously with the $N_2$ stream from the reaction mixture. The reaction time was 180 min. The excess of 2-ethylhexanol was then removed by distillation under a reduced pressure of 50 mbar. 1000 g of the crude di-2-ethylhexyl adipate were neutralized with 150 ml in 0.5% strength aqueous sodium hydroxide solution by stirring at 80° C. for 10 minutes. A two-phase mixture was formed, with an upper organic phase and a lower aqueous phase (waste liquor with hydrolyzed catalyst). The aqueous phase was removed and the organic phase was washed with twice 200 ml of water. For further purification, the neutralized and washed di-2-ethylhexyl adipate was steamed out with steam at 180° C. for 2 hours under a reduced pressure of 50 mbar. The purified di-2-ethylhexyl adipate was then dried at 150° C./50 mbar for 30 minutes by passage of an $N_2$ stream (2 l/h) through it, then stirred together with activated carbon for 5 minutes and filtered off with suction on a suction filter with Supra-Theorit 5 filter aid (temperature 80° C.).

The resulting di-2-ethylhexyl adipate possesses a density at 20° C. of 0.925 g/cm³, a dynamic viscosity at 20° C. of 14.0 mPa-s, a refractive index nD20 of 1.4470, an acid number of 0.04 mg KOH/g, a water content of 0.03% and a purity by GC of 99.93%.

I.c) Preparation of the Plasticizer Plastomoll® DNA (Di-isononyl Adipate)

Process Step 1 (Butene Dimerization):

The butene dimerization was carried out continuously in an adiabatic reactor consisting of two subreactors (length: 4 m each, diameter: 80 cm each) with intermediate cooling at 30 bar. The feed stock used was a raffinate II with the following constitution:

isobutane: 2 weight %
n-butane: 10 weight %
isobutene: 2 weight %
but-1-ene: 32 weight %
trans-but-2-ene: 37 weight %
cis-but-2-ene: 17 weight %

The catalyst used was a material according to DE 4339713, consisting of 50 weight % NiO, 12.5 weight % $TiO_2$, 33.5 weight % $SiO_2$ and 4 weight % $Al_2O_3$ in the form of 5×5 mm tablets. The reaction was carried out with a throughput of 0.375 kg of raffinate II/I of catalyst-h, with a return ratio of unreacted $C_4$ hydrocarbons to fresh raffinate II of 3, an entry temperature at the first subreactor of 38° C. and an entry temperature at the second subreactor of 60° C. The conversion rate, based on the butenes present in the raffinate II, was 83.1%; the selectivity for the desired octenes was 83.3%. The octene fraction was isolated from unreacted raffinate II and the high boilers by fractional distillation of the reactor effluent.

Process Step 2 (Hydrobromylation and Subsequent Hydrogenation):

750 g of the octene mixture prepared in process step 1 were reacted batchwise in an autoclave with 0.13 weight % of dicobalt octacarbonyl $CO_2(CO)_6$ as catalyst with addition of 75 g of water at 185° C. and under a synthesis-gas pressure of 280 bar with an $H_2$ to CO ratio of 60/40 for 5 hours. The consumption of synthesis gas, apparent from a drop in pressure in the autoclave, was made up by further injection. After the autoclave had been let down, the reaction effluent was freed oxidatively from the cobalt catalyst with 10 weight % strength acetic acid and by introduction of air, and the organic product phase was hydrogenated using Raney Nickel at 125° C. under a hydrogen pressure of 280 bar for 10 hours. The isononanol fraction was isolated from the $C_8$ paraffins and the high boilers by fractional distillation of the reaction effluent.

Process Step 3 (Esterification):

In the third process step, 865.74 g of the isononanol fraction obtained in process step 2 (20% molar excess, relative to adipic acid) was reacted with 365.25 g of adipic acid (commercially available product, available for example from BASF SE, Ludwigshafen) and 0.42 g of isopropyl butyl titanate as catalyst (commercially available product, available for example from DuPont, Wilmington, US) in a 2 l autoclave with $N_2$ sparging (10 l/h) with a stirring speed of 500 rpm and a reaction temperature of 230° C. The water of reaction formed was removed continuously from the reaction mixture with the $N_2$ stream. The reaction time was 180 minutes. The excess of isononanol was then distilled off under a reduced pressure of 50 mbar. 1000 g of the crude diisononyl adipate were neutralized with 150 ml of 0.5% strength aqueous sodium hydroxide solution by stirring at 80° C. for 10 minutes. A two-phase mixture was formed, with an upper organic phase and a lower aqueous phase (waste liquor with hydrolyzed catalyst). The aqueous phase was removed and the organic phase was washed with twice 200 ml of water. For further purification, the neutralized and washed diisononyl adipate was steamed out with steam at 180° C. under a reduced pressure of 50 mbar for two hours. The purified diisononyl adipate was then dried at 150° C./50 mbar for 30 minutes by passage of an $N_2$ stream (2 l/h) through it, after which it was stirred together with activated carbon for 5 minutes and filtered off with suction on a suction filter using Supra-Theorit 5 filter aid (temperature 80° C.).

The resulting diisononyl adipate possesses a density at 20° C. of 0.920 g/cm3, a dynamic viscosity at 20° C. of 19.2 mPa-s, a refractive index nD20 of 1.4500, an acid number of 0.03 mg KOH/g, a water content of 0.02% and a purity by GC of 99.86%.

II) Production and Testing of Flexible PVC Films Produced Using Inventive Plasticizer Compositions and Using Commercially Available Plasticizers Formulation:

| Raw material | Proportion [phr] |
| --- | --- |
| PVC (homopolymeric suspension-PVC, brand name Solvin® 271 SP) | 100 |
| Inventive plasticizer composition | 100 |
| Ba—Zn stabilizer, brand name Reagens ® SLX/781 | 2 |

Plasticizer Compositions used:

| | Plasticizer composition | | |
| --- | --- | --- | --- |
| Example | Palamoll ® 638 Amount [%] | Plastomoll ® DOA Amount [%] | Plastomoll ® DNA Amount [%] |
| 1 | 80 | 20 | 0 |
| 2 | 60 | 40 | 0 |
| 3 | 50 | 50 | 0 |
| 4 | 80 | 0 | 20 |
| 5 | 60 | 0 | 40 |
| 6 | 50 | 0 | 50 |
| C1 | 100 | 0 | 0 |
| C2 | 0 | 100 | 0 |
| C3 | 0 | 0 | 100 |

II.a) Production of the Flexible PVC Foils 150 g of PVC (homopolymeric suspension-PVC, brand name Solvin® 271 SP), 150 g of plasticizer composition, and 2 g of Ba/Zn stabilizer, brand name Reagens® SLX/781, were mixed at room temperature using a manual mixer. The mixture was subsequently plastified on an oil-heated laboratory mixing roller bed (Collin, automatic roller bed type 150, diameter 252 mm, width: 450 mm) and processed to a milled sheet. The temperature of the two rolls was 180° C. in each case; the rotary speeds were 15 revolutions/min (front roll) and 12 revolutions/min (rear roll); the rolling time was 5 minutes. This gave a milled sheet with a thickness of 0.53 mm. After cooling, the milled sheet was pressed at a temperature of 190° C. under a pressure of 150 bar over 180 seconds in a press of type "laboratory plate press 400 P (002)" from Collin to give a flexible PVC foil with a thickness of 0.50 mm.

II.b) Testing of the Compatibility of the Plasticizers in the Flexible PVC Foils Purpose of Investigation The test is used to quantify the compatibility of plasticizers in flexible PVC formulations. It is carried out at elevated temperature (70° C.) and 100% relative humidity. The data obtained are evaluated against the storage time.

Test Specimens:

The test is carried out using test specimens (foils) having a size of 75×110×0.5 mm. The foils are perforated on the broad side, inscribed (soldering iron), and weighed.

Test Equipment:

Heraeus drying cabinet at 70° C., analytical balance, Testotherm thermometer with sensor for interior measurement within the drying cabinet.

Procedure:

The temperature in the interior of the drying cabinet is set to the required 70° C. The prepared weighed foils are suspended on a wire rack and Inserted into a glass tank filled to about 5 cm with water (fully demineralized water). Care should be taken to ensure that the foils are not in contact with one another. The lower edges of the foils should not hang into the water. The glass tank is sealed with a polyethylene foil so as to be impervious to water vapor, so that the water vapor subsequently produced in the glass tank is unable to escape. The water level in the glass pond is monitored daily, and any water lost is replaced.

Storage Time:

After 7, 14 and 28 days, two foils are taken from the glass tank and conditioned in the air for one hour, in free suspension. The surfaces of the foils are then cleaned using methanol. The foils are subsequently dried, in free suspension, at 70° C. for 16 hours in a drying cabinet with forced convection. Following removal from the drying cabinet, the foils are conditioned for one hour in free suspension and then weighed. The data reported in each case is the arithmetic mean of the weight loss of the foils.

Results

FIG. 1 and FIG. 2 show the results of the compatibility tests on PVC foils produced using the inventive plasticizer compositions (examples 1 to 6) and also using the pure polymer or monomer plasticizers (comparative examples 1 to 3). The parameter shown is the loss of dry weight [percent] as a function of the test duration (storage time) [days].

As can be seen very clearly in FIG. 1, the pure polymer plasticizer Palamoll® 638 has very poor compatibility with PVC. The weight loss in the compatibility test after 28 days is almost 18%. For a given total plasticizer content of 100 phr, the addition of just phr of Plastomoll® DOA leads to a marked reduction in the weight loss of plasticizer, by almost half, and hence to a marked improvement in compatibility. Through further increase in the amount of Plastomoll® DOA added, for the same overall plasticizer content, the weight loss can be reduced virtually down to the level of the low weight loss of the pure Plastomoll® DOA.

As can be seen very clearly in FIG. 2, the addition of just 20 phr of Plastomoll® DNA, for the same overall plasticizer content of 100 phr, also leads to a marked reduction in the weight loss of plasticizer, by almost half, and hence to a marked improvement in compatibility. Here again, through further increase in the addition of Plastomoll® DNA, with the same overall plasticizer content, the weight loss can be reduced virtually down to the level of the low weight loss of the pure Plastomoll® DNA.

What is claimed is:

1. A plasticizer composition comprising
a) one or more compounds of the formula (I),

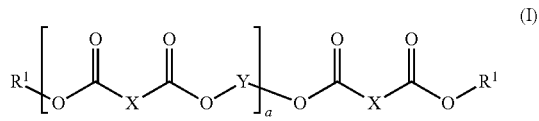

(I)

in which
X independently at each occurrence is an unbranched or branched $C_2$-$C_8$ alkylene group or an unbranched or branched $C_2$-$C_8$ alkenylene group, comprising at least one double bond,
Y is an unbranched or branched $C_2$-$C_{12}$ alkylene group or an unbranched or branched $C_2$-$C_{12}$ alkenylene group, comprising at least one double bond,
a is an integer from 1 to 100,
and
$R^1$ independently at each occurrence is selected from unbranched or branched $C_5$-$C_{12}$ alkyl-radicals,
where the groups X present in the compounds (I) can be the same or different from one another and where, in the event that the compounds (I) comprise more than one group Y, these groups are the same, and
b) one or more compounds of the formula (II), $R^2$—O—C(=O)—Z—C(=O)—O—$R^3$ (II)

in which
Z is an unbranched $C_2$-$C_5$ alkylene group or an unbranched $C_2$-$C_4$ alkenylene group having a double bond,
and $R^2$ and $R^3$ independently of one another are selected from unbranched and branched $C_4$-$C_{12}$ alkyl radicals,
wherein the amount of compounds of the general formula (I) in the plasticizer composition according to the invention is 50 to 90 wt %, based on the total amount of compounds (I) and (II) in the plasticizer composition.

2. The plasticizer composition according to claim 1, wherein $R^1$ independently at each occurrence is selected from unbranched or branched $C_7$-$C_{12}$ alkyl radicals.

3. The plasticizer composition according to claim 1, wherein the weight-average molar mass of the compound of the formula (I) is in the range from 500 to 15 000.

4. The plasticizer composition according to claim 1, wherein in the compound of the formula (I), X independently at each occurrence being a branched or unbranched $C_2$-$C_6$ alkylene group and Y being a branched or unbranched $C_2$-$C_5$ alkylene group.

5. The plasticizer composition according to claim 1, wherein the groups X present in the compound of the formula (I) being the same and the compound of the formula (I) comprising more than one group Y.

6. The plasticizer composition according to claim 1, wherein $R^1$ in the compound of the formula (I) independently at each occurrence being n-octyl, isooctyl, 2-ethylhexyl, n-nonyl, isononyl, 2-propylhexyl, n-decyl, isodecyl, or 2-propylheptyl.

7. The plasticizer composition according to claim 1, wherein both radicals $R^1$ in the compound of the formula (I) being n-octyl, both being isononyl, or both being 2-propylheptyl.

8. The plasticizer composition according to claim 1, wherein Z in the compound of the formula (II) being an unbranched $C_2$-$C_5$ alkylene group.

9. The plasticizer composition according to claim 1, $R^2$ and $R^3$ in the compound of the formula (II) both being 2-ethylhexyl, both being isononyl, or both being 2-propylheptyl.

10. The plasticizer composition according to claim 1, the plasticizer composition optionally comprising a further plasticizer which is different from the compounds (I) and (II) and which is selected from phthalic acid alkyl aralkyl esters, 1,2-cyclohexanedicarboxylic esters 1,3-cyclohexanedicarboxylic esters, 1,4-cyclohexanedicarboxylic esters, trimellitic trialkyl esters, benzoic alkyl esters, dibenzoic esters of glycols, hydroxybenzoic esters, esters of saturated monocarboxylic acids, esters of unsaturated monocarboxylic acids, esters of saturated dicarboxylic acids other than compounds (II), esters of unsaturated dicarboxylic acids other than compounds (II), amides and esters of aromatic sulfonic acids, alkylsulfonic esters, glycerol esters, isosorbide esters, phosphoric esters, citric triesters, alkylpyrrolidone derivatives, 2,5-furandicarboxylic esters, 2,5-tetrahydrofurandicarboxylic esters, epoxidized vegetable oils and epoxidized fatty acid monoalkyl esters, and polyesters of aliphatic and/or aromatic polycarboxylic acids with at least dihydric alcohols, other than compounds (I).

11. The plasticizer composition according to claim 1, wherein the plasticizer composition does not comprise any further plasticizers other than the compounds (I) and (II).

12. The plasticizer composition according to claim 1, wherein the weight ratio between compound of the formula (II) and compound of the formula (I) is in the range from 1:10 to 1:1.

13. A molding composition comprising at least one polymer and a plasticizer composition as defined in claim 1.

14. The molding composition according to claim 13, wherein the polymer is a thermoplastic polymer selected from the group consisting of
    homopolymers or copolymers comprising in copolymerized form at least one monomer selected from $C_2$-$C_{10}$ monoolefins, 1,3-butadiene, 2-chloro-1,3-butadiene, vinyl alcohol and its $C_2$-$C_{10}$ alkyl esters, vinyl chloride, vinylidene chloride, vinylidene fluoride, tetrafluoroethylene, glycidyl acrylate, glycidyl methacrylate, acrylates and methacrylates of $C_1$-$C_{10}$ alcohols, vinylaromatics, (meth)acrylonitrile, maleic anhydride, and α,β-ethylenically unsaturated monocarboxylic and dicarboxylic acids,
    homopolymers and copolymers of vinyl acetals,
    polyvinyl esters,
    polycarbonates,
    polyesters,
    polyethers,
    polyetherketones,
    thermoplastic polyurethanes,
    polysulfides,
    polysulfones,
    polyethersulfones,
    cellulose alkyl esters,
    and mixtures thereof.

15. The molding composition according to claim 14, the thermoplastic polymer being selected from polyvinyl chloride (PVC), polyvinyl butyral (PVB), homopolymers and copolymers of vinyl acetate, homopolymers and copolymers of styrene, polyacrylates, thermoplastic polyurethanes (TPU), or polysulfides.

16. The molding composition according to claim 14, wherein the thermoplastic polymer is polyvinyl chloride (PVC).

17. The molding composition according to claim 16, the amount of the plasticizer composition in the molding composition being 5.0 to 300 phr.

18. The molding composition according to claim 13, wherein the polymer is an elastomer, selected from the group consisting of natural rubbers, synthetic rubbers, and mixtures thereof.

19. The molding composition according to claim 18, the amount of the plasticizer composition in the molding composition being 1.0 to 60 phr.

20. Housings of electrical devices, computer housings, tooling, piping, cables, hoses, wire sheathing, window profiles, plastics profiles for conveying apparatuses, vehicle-construction components, tires, furniture, cushion foam and mattress foam, tarpaulins, roofing felt, gaskets, composite foils, self-adhesive films, laminating films, recording disks, synthetic leather, packaging containers, adhesive-tape foils, or coatings which comprises the molding composition as claimed in claim 13.

21. A molding or foil which comes directly into contact with humans or foods which comprises the molding composition as claimed in claim 13.

22. The molding or foil as claimed in claim 21, wherein the molding or foil is a medical product, hygiene product, packaging for food or drink, product for the interior sector, a toy, a child-care item, a sports-and-leisure product, apparel, or fiber for textiles.

23. A molding composition comprising at least one thermoplastic polymer other than polyvinyl chloride and a plasticizer composition, the amount of the plasticizer composition in the molding composition being 0.5 to 300 phr and wherein said plasticizer composition comprises a) one or more compounds of the formula (I),

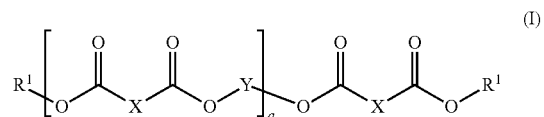

in which
X independently at each occurrence is an unbranched or branched $C_2$-$C_8$ alkylene group or an unbranched or branched $C_2$-$C_8$ alkenylene group, comprising at least one double bond,
Y is an unbranched or branched $C_2$-$C_{12}$ alkylene group or an unbranched or branched $C_2$-$C_{12}$ alkenylene group, comprising at least one double bond,
a is an integer from 1 to 100,
and
$R^1$ independently at each occurrence is selected from unbranched or branched $C_4$-$C_{12}$ alkyl radicals,
where the groups X present in the compounds (I) can be the same or different from one another and where, in the event that the compounds (I) comprise more than one group Y, these groups are the same, and b) one or more compounds of the formula (II),

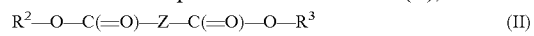

in which
Z is an unbranched $C_2$-$C_5$ alkylene group or an unbranched $C_2$-$C_4$ alkenylene group having a double bond,
and
$R^2$ and $R^3$ independently of one another are selected from unbranched and branched $C_4$-$C_{12}$ alkyl radicals,
wherein the amount of compounds of the general formula (I) in the plasticizer composition according to the invention is 50 to 90 wt %, based on the total amount of compounds (I) and (II) in the plasticizer composition.

24. The molding composition according to claim 23, wherein the thermoplastic polymer is selected from the group consisting of
    homopolymers or copolymers comprising in copolymerized form at least one monomer selected from $C_2$-$C_{10}$ monoolefins, 1,3-butadiene, 2-chloro-1,3-butadiene, vinyl alcohol and its $C_2$-$C_{10}$ alkyl esters, vinylidene chloride, vinylidene fluoride, tetrafluoroethylene, glycidyl acrylate, glycidyl methacrylate, acrylates and methacrylates of $C_1$-$C_{10}$ alcohols, vinylaromatics, (meth)acrylonitrile, maleic anhydride, and α,β-ethylenically unsaturated monocarboxylic and dicarboxylic acids,
    homopolymers and copolymers of vinyl acetals,
    polyvinyl esters,
    polycarbonates,
    polyesters,
    polyethers,
    polyetherketones,
    thermoplastic polyurethanes,
    polysulfides,
    polysulfones,
    polyethersulfones,
    cellulose alkyl esters,
    and mixtures thereof.

* * * * *